United States Patent
Ha et al.

(10) Patent No.: US 9,742,214 B2
(45) Date of Patent: Aug. 22, 2017

(54) WIRELESS POWER TRANSFER SYSTEM AND WIRELESS CHARGING SYSTEM

(71) Applicant: LG ELECTRONICS INC., Seoul (KR)

(72) Inventors: Minhun Ha, Seoul (KR); Donghan Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 139 days.

(21) Appl. No.: 14/724,342

(22) Filed: May 28, 2015

(65) Prior Publication Data

US 2016/0043590 A1    Feb. 11, 2016

(30) Foreign Application Priority Data

Aug. 11, 2014 (KR) .................. 10-2014-0103851

(51) Int. Cl.
| | |
|---|---|
| *H02J 7/00* | (2006.01) |
| *H01F 38/14* | (2006.01) |
| *H02J 7/02* | (2016.01) |
| *H02J 50/40* | (2016.01) |
| *H02J 50/12* | (2016.01) |
| *H02J 50/80* | (2016.01) |

(52) U.S. Cl.
CPC .............. *H02J 7/025* (2013.01); *H02J 50/12* (2016.02); *H02J 50/40* (2016.02); *H02J 50/80* (2016.02)

(58) Field of Classification Search
CPC .......... H02J 7/025; H02J 7/0042; H02J 5/005; H04B 5/0037
USPC .......................................... 320/108; 307/104
See application file for complete search history.

(56) References Cited

U.S. PATENT DOCUMENTS

| | | | | | |
|---|---|---|---|---|---|
| 5,898,292 | A  | * | 4/1999 | Takemoto .......... | G01R 31/3624 320/136 |
| 6,060,864 | A  | * | 5/2000 | Ito ..................... | G01R 19/16542 320/134 |
| 6,993,367 | B2 | * | 1/2006 | Yamato ............... | H04M 1/6091 455/569.1 |
| 7,417,402 | B2 | * | 8/2008 | Kim ........................ | H02J 7/025 320/108 |
| 9,093,724 | B2 | * | 7/2015 | Fujitake .............. | B60L 11/1816 |
| 9,112,363 | B2 | * | 8/2015 | Partovi ................... | H02J 7/025 |

(Continued)

FOREIGN PATENT DOCUMENTS

JP        2014-082864        5/2014

OTHER PUBLICATIONS

PCT International Application No. PCT/KR2015/004933, Written Opinion of the International Searching Authority dated Aug. 24, 2015, 11 pages.

*Primary Examiner* — M'Baye Diao
(74) *Attorney, Agent, or Firm* — Lee, Hong, Degerman, Kang & Waimey

(57) ABSTRACT

Disclosed is a wireless power receiving apparatus for wirelessly receiving power. The wireless power receiving apparatus includes a power receiving unit configured to wirelessly receive power, a charging unit configured to receive the power from the power receiving unit, and supply the power to a battery, and a control unit configured to determine an output voltage, which enables a charging efficiency of power, supplied to the battery, to be the maximum, based on an output capacity output from the power receiving unit, and control the power receiving unit for the battery to be charged with the output voltage.

20 Claims, 18 Drawing Sheets

(56) References Cited

U.S. PATENT DOCUMENTS

| | | | |
|---|---|---|---|
| 9,457,791 B2* | 10/2016 | Vitale | B60L 3/0069 |
| 2012/0104867 A1 | 5/2012 | Mudrick et al. | |
| 2013/0058379 A1* | 3/2013 | Kim | H04B 5/0031 |
| | | | 375/146 |
| 2013/0207601 A1 | 8/2013 | Wu et al. | |
| 2013/0221915 A1 | 8/2013 | Son et al. | |
| 2014/0054970 A1 | 2/2014 | Keeling et al. | |
| 2015/0035480 A1* | 2/2015 | Shichino | H02J 7/0004 |
| | | | 320/107 |

* cited by examiner

WIRELESS POWER TRANSFER SYSTEM AND WIRELESS CHARGING SYSTEM

CROSS-REFERENCE TO RELATED APPLICATION

Pursuant to 35 U.S.C. §119(a), this application claims the benefit of earlier filing date and right of priority to Korean Application No. 10-2014-0103851, filed on Aug. 11, 2014, the contents of which is incorporated by reference herein in its entirety.

BACKGROUND OF THE DISCLOSURE

1. Field of the Disclosure

The present disclosure relates to a wireless power transfer system and a wireless charging system.

2. Background of the Disclosure

Instead of a method that supplies electrical energy to a plurality of wireless power receiving apparatuses by wire, a method that wirelessly supplies electrical energy without a contact is recently used. Wireless power receiving apparatuses that wirelessly receive energy may be directly driven with wireless power which is received. Alternatively, a battery is charged with the received wireless power, and the wireless power receiving apparatuses may be driven with power charged in the battery.

Wireless power consortium that treats wireless power transfer technology using a magnetic induction scheme disclosed the standard document "System Description Wireless Power Transfer, Volume 1, Low Power, Part 1: Interface Definition, Version 1.00 Release Candidate 1" on Apr. 12, 2010.

Power Matters Alliance, another technology standard consortium, was established on March, 2012, and disclosed the standard document based on inductive coupling technology for advancing the product group of the interface standard and supplying inductive resonance power.

In wireless charging using the method, the necessity for increasing charging efficiency is increasing in transferring power. Also, as a size of a device increases, chargers which are charged with medium power or high power as well as low power are being required.

Therefore, provided is a wireless charging receiving apparatus which enhances charging efficiency, and performs charging with medium power or high power as well as low power.

SUMMARY OF THE DISCLOSURE

Therefore, an aspect of the detailed description is to provide a mechanism that enhances charging efficiency in a wireless power transfer apparatus and a wireless charging system.

Another aspect of the detailed description is to provide a wireless power transfer apparatus and a wireless charging system, which are available even in medium power or high power as well as low power.

To achieve these and other advantages and in accordance with the purpose of this specification, as embodied and broadly described herein, a wireless power receiving apparatus for wirelessly receiving power includes: a power receiving unit configured to wirelessly receive power; a charging unit configured to receive the power from the power receiving unit, and supply the power to a battery; and a control unit configured to determine an output voltage, which enables a charging efficiency of power, supplied to the battery, to be the maximum, based on an output capacity output from the power receiving unit, and control the power receiving unit for the battery to be charged with the output voltage.

In an embodiment, the control unit may sense a change in the output capacity output from the power receiving unit in real time or at a predetermined time interval, and change an output voltage, which is to be supplied to the battery, in real time depending on the change in the output capacity.

In an embodiment, when the output capacity output from the power receiving unit is a first output capacity, the control unit may determine the output voltage, which is to be supplied to the battery, as a first output voltage. Also, when the output capacity output from the power receiving unit is a second output capacity, the control unit may determine the output voltage, which is to be supplied to the battery, as a second output voltage. Also, the control unit may control the power receiving unit to supply the determined output voltage to the battery as power.

In an embodiment, while the first output voltage is being supplied to the battery as power in the first output capacity, when the output capacity is changed to the second output capacity, the control unit may change the first output voltage to the second output voltage.

In an embodiment, when the output capacity is equal to or lower than a predetermined output capacity, the control unit may control the charging unit to stop supply of the power to the battery.

In an embodiment, the control unit may detect the output capacity output from the power receiving unit at a predetermined interval so that charging efficiency is the maximum, change an output voltage to be supplied to the battery in real time, and control the power receiving unit to supply the changed output voltage as power.

In an embodiment, the control unit may determine an output capacity output from the power receiving unit by using a currently set voltage and a current output from the power receiving unit, and the control unit may control the power receiving unit to change the currently set voltage to another voltage, based on the determined output capacity and supply power to the battery.

In an embodiment, the control unit may detect a current supplied from the charging unit to the battery, and determine an output capacity to be supplied to the battery by using the detected current, a currently set voltage, and a charging efficiency of the charging unit, and the control unit may control the power receiving unit to change the currently set voltage to another voltage, based on the output capacity.

In an embodiment, when a current supplied to the battery is equal to or lower than a predetermined value, the control unit may control the charging unit to stop supply of power to the battery.

In another aspect of the present invention, a power supply method performed by a wireless power receiving apparatus for wirelessly receiving power includes: wirelessly receiving power; detecting an output capacity supplied to a battery in the received power; determining an output voltage which enables a charging efficiency of the battery to be the maximum, based on the detected output capacity; and supplying the determined output voltage to a battery as power, wherein while the power is being supplied to the battery, when an output capacity supplied to the battery is changed, the determined output voltage is changed to an output voltage corresponding to the changed output capacity.

In an embodiment, the detecting of the output capacity may include: sensing a current supplied to the battery at a predetermined interval or in real time to detect an output capacity; and when a change in the output capacity is sensed, changing an output voltage to be supplied to the battery in real time.

In an embodiment, different output voltages may be mapped to different output capacities, and the determining of the output voltage may include, when a currently set output voltage differs from an output voltage mapped to a currently detected output capacity, changing the currently set output voltage to the output voltage corresponding to the currently detected output capacity.

In an embodiment, the determining of the output voltage may include, when the currently set output voltage matches the output voltage mapped to the currently detected output capacity, maintaining the currently set output voltage.

In an embodiment, the determining of the output voltage may include: when the detected output capacity is a first output capacity, determining the output voltage as a first output voltage; and when the detected output capacity is a second output capacity, determining the output voltage as a second output voltage.

In an embodiment, the supplying of the determined output voltage may include, when the output voltage is equal to or lower than a predetermined value, stopping supply of the power.

In another aspect of the present invention, a wireless charging system includes: a transfer apparatus configured to wirelessly transfer power; and a receiving apparatus configured to receive wireless power from the transfer apparatus, wherein the receiving apparatus includes: a power receiving unit configured to wirelessly receive power; a charging unit configured to receive the power from the power receiving unit, and supply the power to a battery; and a control unit configured to determine an output voltage to be supplied to the battery, to be the maximum, based on an output capacity output from the power receiving unit, and control the power receiving unit to output the output voltage.

In an embodiment, the control unit may sense a change in the output capacity output from the power receiving unit in real time or at a predetermined time interval, and change an output voltage, which is to be supplied to the battery, in real time depending on the change in the output capacity.

In an embodiment, the control unit may detect a change in the output capacity output from the power receiving unit in real time or at a predetermined interval, and change an output voltage to be supplied to the battery in real time, based on the change in the output capacity.

In an embodiment, when the output capacity output from the power receiving unit is a first output capacity, the control unit may determine the output voltage, which is to be supplied to the battery, as a first output voltage. Also, when the output capacity output from the power receiving unit is a second output capacity, the control unit may determine the output voltage, which is to be supplied to the battery, as a second output voltage. Also, the control unit may control the power receiving unit to supply the determined output voltage to the battery as power.

In an embodiment, while the first output voltage is being supplied to the battery as power in the first output capacity, when the output capacity is changed to the second output capacity, the control unit may change the first output voltage to the second output voltage.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Figure 1:
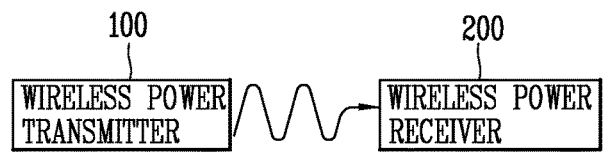
FIG. 1 is an exemplary diagram conceptually illustrating a wireless power transfer apparatus and a wireless power receiving apparatus according to embodiments of the present invention.

The technologies disclosed herein may be applicable to wireless power transfer (or wireless power transmission). However, the technologies disclosed herein are not limited to this, and may be also applicable to all kinds of power transmission systems and methods, wireless charging circuits and methods to which the technological spirit of the technology can be applicable, in addition to the methods and apparatuses using power transmitted in a wireless manner.

It should be noted that technological terms used herein are merely used to describe a specific embodiment, but not to limit the present invention. Also, unless particularly defined otherwise, technological terms used herein should be construed as a meaning that is generally understood by those having ordinary skill in the art to which the invention pertains, and should not be construed too broadly or too narrowly. Furthermore, if technological terms used herein are wrong terms unable to correctly express the spirit of the invention, then they should be replaced by technological terms that are properly understood by those skilled in the art. In addition, general terms used in this invention should be construed based on the definition of dictionary, or the context, and should not be construed too broadly or too narrowly.

Incidentally, unless clearly used otherwise, expressions in the singular number include a plural meaning. In this application, the terms "comprising" and "including" should not be construed to necessarily include all of the elements or steps disclosed herein, and should be construed not to include some of the elements or steps thereof, or should be construed to further include additional elements or steps.

In addition, a suffix "module" or "unit" used for constituent elements disclosed in the following description is merely intended for easy description of the specification, and the suffix itself does not give any special meaning or function.

Furthermore, the terms including an ordinal number such as first, second, etc. can be used to describe various elements, but the elements should not be limited by those terms. The terms are used merely for the purpose to distinguish an element from the other element. For example, a first element may be named to a second element, and similarly, a second element may be named to a first element without departing from the scope of right of the invention.

Hereinafter, preferred embodiments of the present invention will be described in detail with reference to the accompanying drawings, and the same or similar elements are designated with the same numeral references regardless of the numerals in the drawings and their redundant description will be omitted.

In describing the present invention, moreover, the detailed description will be omitted when a specific description for publicly known technologies to which the invention pertains is judged to obscure the gist of the present invention. Also, it should be noted that the accompanying drawings are merely illustrated to easily explain the spirit of the invention, and therefore, they should not be construed to limit the spirit of the invention by the accompanying drawings.

DEFINITION

Many-to-one communication: communicating between one transmitter (Tx) and many receivers (Rx)

Unidirectional communication: transmitting a required message only from a receiver to a transmitter Bidirectional communication: allowing message transmission from a transmitter to a receiver and from the receiver to the transmitter, namely, at both sides Here, the transmitter and the receiver indicate the same as a transmitting unit (device) and a receiving unit (device), respectively. Hereinafter, those terms may be used together.

Conceptual View of Wireless Power Transmitter and Wireless Power Receiver

FIG. 1 is an exemplary view conceptually illustrating a wireless power transmitter and a wireless power receiver according to the embodiments of the present invention.

Referring to FIG. 1, a wireless power transmitter 100 may be a power transfer apparatus configured to transfer power required for a wireless power receiver 200 in a wireless manner.

Furthermore, the wireless power transmitter 100 may be a wireless charging apparatus configured to charge a battery of the wireless power receiver 200 by transferring power in a wireless manner.

Additionally, the wireless power transmitter 100 may be implemented with various forms of apparatuses transferring power to the wireless power receiver 200 requiring power in a contactless state.

The wireless power receiver 200 is a device that is operable by receiving power from the wireless power transmitter 100 in a wireless manner. Furthermore, the wireless power receiver 200 may charge a battery using the received wireless power.

On the other hand, the wireless power receiver for receiving power in a wireless manner as described herein should be construed broadly to include a portable phone, a cellular phone, a smart phone, a personal digital assistant (PDA), a portable multimedia player (PMP), a tablet, a multimedia device, or the like, in addition to an input/output device such as a keyboard, a mouse, an audio-visual auxiliary device, and the like.

The wireless power receiver 200, as described later, may be a mobile communication terminal (for example, a portable phone, a cellular phone, a tablet and the like) or a multimedia device.

On the other hand, the wireless power transmitter 100 may transfer power in a wireless manner without mutual contact to the wireless power receiver 200 using one or more wireless power transfer methods. In other words, the wireless power transmitter 100 may transfer power using at least one of an inductive coupling method based on magnetic induction phenomenon by the wireless power signal and a magnetic resonance coupling method based on electromagnetic resonance phenomenon by a wireless power signal at a specific frequency.

Wireless power transfer in the inductive coupling method is a technology transferring power in a wireless manner using a primary coil and a secondary coil, and refers to the transmission of power by inducing a current from a coil to another coil through a changing magnetic field by a magnetic induction phenomenon.

Wireless power transfer in the inductive coupling method refers to a technology in which the wireless power receiver 200 generates resonance by a wireless power signal transmitted from the wireless power transmitter 100 to transfer power from the wireless power transmitter 100 to the wireless power receiver 200 by the resonance phenomenon.

Hereinafter, the wireless power transmitter 100 and wireless power receiver 200 according to the embodiments disclosed herein will be described in detail. In assigning reference numerals to the constituent elements in each of the following drawings, the same reference numerals will be used for the same constituent elements even though they are shown in a different drawing.

Figure 2A:
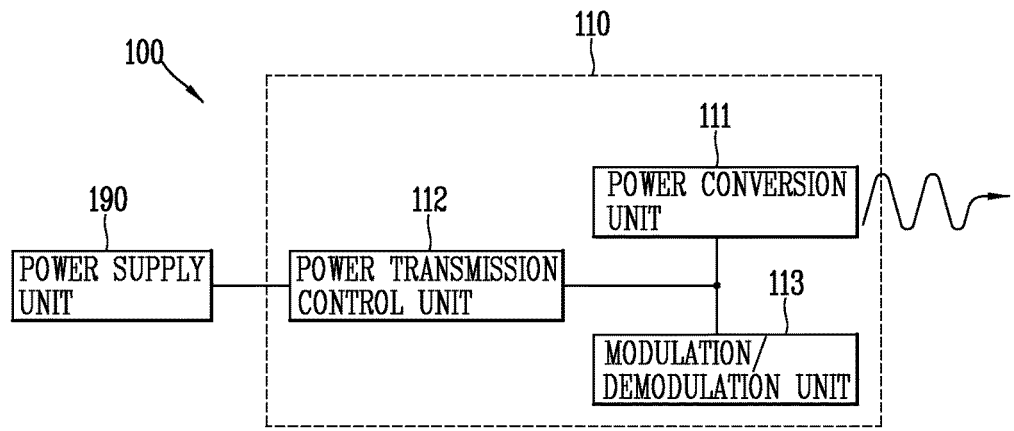
FIG. 2A is a block diagram exemplarily illustrating a configuration of a wireless power transfer apparatus according to embodiments disclosed in the present specification.
Figure 2B:
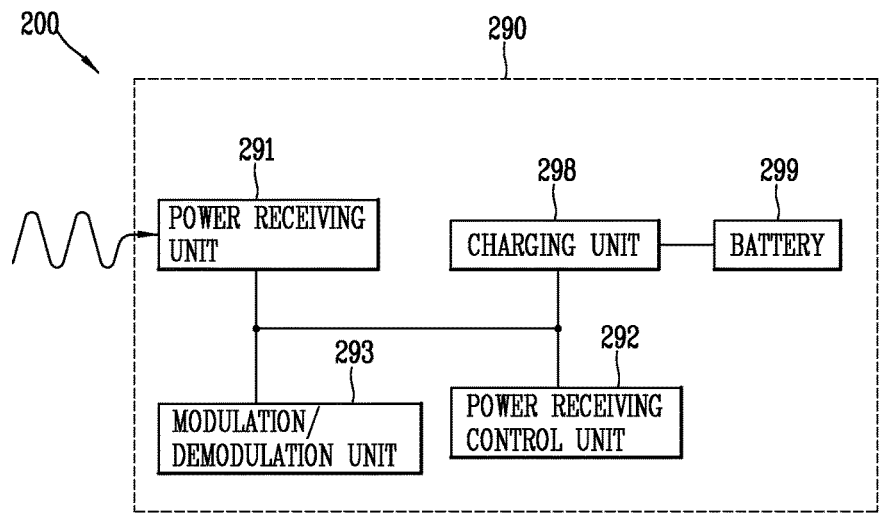
FIG. 2B is a block diagram exemplarily illustrating a configuration of a wireless power receiving apparatus according to embodiments disclosed in the present specification.

FIGS. 2A and 2B are exemplary block diagrams illustrating the configuration of a wireless power transmitter 100 and a wireless power receiver 200 that can be employed in the embodiments disclosed herein.

Wireless Power Transmitter

Referring to FIG. 2A, the wireless power transmitter 100 may include a power transmission unit 110. The power transmission unit 110 may include a power conversion unit 111 and a power transmission control unit 112.

The power conversion unit 111 transfers power supplied from a transmission side power supply unit 190 to the wireless power receiver 200 by converting it into a wireless power signal. The wireless power signal transferred by the power conversion unit 111 is generated in the form of a magnetic field or electro-magnetic field having an oscillation characteristic. For this purpose, the power conversion unit 111 may be configured to include a coil for generating the wireless power signal.

The power conversion unit 111 may include a constituent element for generating a different type of wireless power signal according to each power transfer method. For example, the power conversion unit 111 may include a primary coil for forming a changing magnetic field to induce a current to a secondary coil of the wireless power receiver 200. Furthermore, the power conversion unit 111 may include a coil (or antenna) for forming a magnetic field having a specific resonant frequency to generate a resonant frequency in the wireless power receiver 200 according to the resonance coupling method.

Furthermore, the power conversion unit 111 may transfer power using at least one of the foregoing inductive coupling method and the resonance coupling method.

Among the constituent elements included in the power conversion unit 111, those for the inductive coupling method will be described later with reference to FIGS. 4 and 5, and those for the resonance coupling method will be described with reference to FIGS. 7 and 8.

On the other hand, the power conversion unit 111 may further include a circuit for controlling the characteristics of a used frequency, an applied voltage, an applied current or the like to form the wireless power signal.

The power transmission control unit 112 controls each of the constituent elements included in the power transmission unit 110. The power transmission control unit 112 may be implemented to be integrated into another control unit (not shown) for controlling the wireless power transmitter 100.

On the other hand, a region which the wireless power signal can be approached may be divided into two types. First, an active area denotes a region through which a wireless power signal transferring power to the wireless power receiver 200 is passed. Next, a semi-active area denotes an interest region in which the wireless power transmitter 100 can detect the existence of the wireless power receiver 200. Here, the power transmission control unit 112 may detect whether the wireless power receiver 200 is placed in the active area or detection area or removed from the area. Specifically, the power transmission control unit 112 may detect whether or not the wireless power receiver 200 is placed in the active area or detection area using a wireless power signal formed from the power conversion unit 111 or a sensor separately provided therein. For instance, the power transmission control unit 112 may detect the presence of the wireless power receiver 200 by monitoring whether or not the characteristic of power for forming the wireless power signal is changed by the wireless power signal, which is affected by the wireless power receiver 200 existing in the detection area. However, the active area and detection area may vary according to the wireless power transfer method such as an inductive coupling method, a resonance coupling method, and the like.

The power transmission control unit 112 may perform the process of identifying the wireless power receiver 200 or determine whether to start wireless power transfer according to a result of detecting the existence of the wireless power receiver 200.

Furthermore, the power transmission control unit 112 may determine at least one characteristic of a frequency, a voltage, and a current of the power conversion unit 111 for forming the wireless power signal. The determination of the characteristic may be carried out by a condition at the side of the wireless power transmitter 100 or a condition at the side of the wireless power receiver 200.

The power transmission control unit 112 may receive a power control message from the wireless power receiver 200. The power transmission control unit 112 may determine at least one characteristic of a frequency, a voltage and a current of the power conversion unit 111 based on the received power control message, and additionally perform other control operations based on the power control message.

For example, the power transmission control unit 112 may determine at least one characteristic of a frequency, a voltage and a current used to form the wireless power signal according to the power control message including at least one of rectified power amount information, charging state information and identification information in the wireless power receiver 200.

Furthermore, as another control operation using the power control message, the wireless power transmitter 100 may perform a typical control operation associated with wireless power transfer based on the power control message. For example, the wireless power transmitter 100 may receive information associated with the wireless power receiver 200 to be auditorily or visually outputted through the power control message, or receive information required for authentication between devices.

In exemplary embodiments, the power transmission control unit 112 may receive the power control message through the wireless power signal. In other exemplary embodiment, the power transmission control unit 112 may receive the power control message through a method for receiving user data.

In order to receive the foregoing power control message, the wireless power transmitter 100 may further include a modulation/demodulation unit 113 electrically connected to the power conversion unit 111. The modulation/demodulation unit 113 may demodulate a wireless power signal that has been modulated by the wireless power receiver 200 and use it to receive the power control message.

In addition, the power transmission control unit 112 may acquire a power control message by receiving user data including the power control message by a communication means (not shown) included in the wireless power transmitter 100.

[For Supporting in-Band Two-Way Communication]

Under a wireless power transfer environment allowing for bi-directional communications according to the exemplary embodiments disclosed herein, the power transmission control unit 112 may transmit data to the wireless power receiver 200. The data transmitted by the power transmission control unit 112 may be transmitted to request the wireless power receiver 200 to send the power control message.

Wireless Power Receiver

Referring to FIG. 2B, the wireless power receiver 200 may include a power supply unit 290. The power supply unit 290 supplies power required for the operation of the wireless power receiver 200. The power supply unit 290 may include a power receiving unit 291 and a power reception control unit 292.

The power receiving unit 291 receives power transferred from the wireless power transmitter 100 in a wireless manner.

The power receiving unit 291 may include constituent elements required to receive the wireless power signal according to a wireless power transfer method. Furthermore, the power receiving unit 291 may receive power according to at least one wireless power transfer method, and in this case, the power receiving unit 291 may include constituent elements required for each method.

First, the power receiving unit 291 may include a coil for receiving a wireless power signal transferred in the form of a magnetic field or electromagnetic field having a vibration characteristic.

For instance, as a constituent element according to the inductive coupling method, the power receiving unit 291 may include a secondary coil to which a current is induced by a changing magnetic field. In exemplary embodiments, the power receiving unit 291, as a constituent element according to the resonance coupling method, may include a coil and a resonant circuit in which resonance phenomenon is generated by a magnetic field having a specific resonant frequency.

In another exemplary embodiments, when the power receiving unit 291 receives power according to at least one wireless power transfer method, the power receiving unit 291 may be implemented to receive power by using a coil, or implemented to receive power by using a coil formed differently according to each power transfer method.

Among the constituent elements included in the power receiving unit 291, those for the inductive coupling method will be described later with reference to FIGS. 4A and 4B, and those for the resonance coupling method with reference to FIGS. 7A and 7B.

On the other hand, the power receiving unit 291 may further include a rectifier and a regulator to convert the wireless power signal into a direct current. Furthermore, the power receiving unit 291 may further include a circuit for protecting an overvoltage or overcurrent from being generated by the received power signal.

The power reception control unit 292 may control each constituent element included in the power supply unit 290.

Specifically, the power reception control unit 292 may transfer a power control message to the wireless power transmitter 100. The power control message may instruct the wireless power transmitter 100 to initiate or terminate a transfer of the wireless power signal. Furthermore, the power control message may instruct the wireless power transmitter 100 to control a characteristic of the wireless power signal.

In exemplary embodiments, the power reception control unit 292 may transmit the power control message through at least one of the wireless power signal and user data.

In order to transmit the foregoing power control message, the wireless power receiver 200 may further include a modulation/demodulation unit 293 electrically connected to the power receiving unit 291. The modulation/demodulation unit 293, similarly to the case of the wireless power transmitter 100, may be used to transmit the power control message through the wireless power signal. The power communications modulation/demodulation unit 293 may be used as a means for controlling a current and/or voltage flowing through the power conversion unit 111 of the wireless power transmitter 100. Hereinafter, a method for allowing the power communications modulation/demodulation unit 113 or 293 at the side of the wireless power transmitter 100 and at the side of the wireless power receiver 200, respectively, to be used to transmit and receive a power control message through a wireless power signal will be described.

A wireless power signal formed by the power conversion unit 111 is received by the power receiving unit 291. At this time, the power reception control unit 292 controls the power communications modulation/demodulation unit 293 at the side of the wireless power receiver 200 to modulate the wireless power signal. For instance, the power reception control unit 292 may perform a modulation process such that a power amount received from the wireless power signal is varied by changing a reactance of the power communications modulation/demodulation unit 293 connected to the power receiving unit 291. The change of a power amount received from the wireless power signal results in the change of a current and/or voltage of the power conversion unit 111 for forming the wireless power signal. At this time, the modulation/demodulation unit 113 at the side of the wireless power transmitter 100 may detect a change of the current and/or voltage to perform a demodulation process.

In other words, the power reception control unit 292 may generate a packet including a power control message intended to be transferred to the wireless power transmitter 100 and modulate the wireless power signal to allow the packet to be included therein, and the power transmission control unit 112 may decode the packet based on a result of performing the demodulation process of the power communications modulation/demodulation unit 113 to acquire the power control message included in the packet.

In addition, the power reception control unit 292 may transmit a power control message to the wireless power transmitter 100 by transmitting user data including the power control message by a communication means (not shown) included in the wireless power receiver 200.

[For Supporting in-Band Two-Way Communication]

Under a wireless power transfer environment allowing for bi-directional communications according to the exemplary embodiments disclosed herein, the power reception control unit 292 may receive data to the wireless power transmitter 100. The data transmitted by the wireless power transmitter 100 may be transmitted to request the wireless power receiver 200 to send the power control message.

In addition, the power supply unit 290 may further include a charger 298 and a battery 299.

The wireless power receiver 200 receiving power for operation from the power supply unit 290 may be operated by power transferred from the wireless power transmitter 100, or operated by charging the battery 299 using the transferred power and then receiving the charged power. At this time, the power reception control unit 292 may control the charger 298 to perform charging using the transferred power.

Hereinafter, description will be given of a wireless power transmitter and a wireless power receiver applicable to the exemplary embodiments disclosed herein. First, a method of allowing the wireless power transmitter to transfer power to the electronic device according to the inductive coupling method will be described with reference to FIGS. 3 through 5.

Inductive Coupling Method

Figure 3:
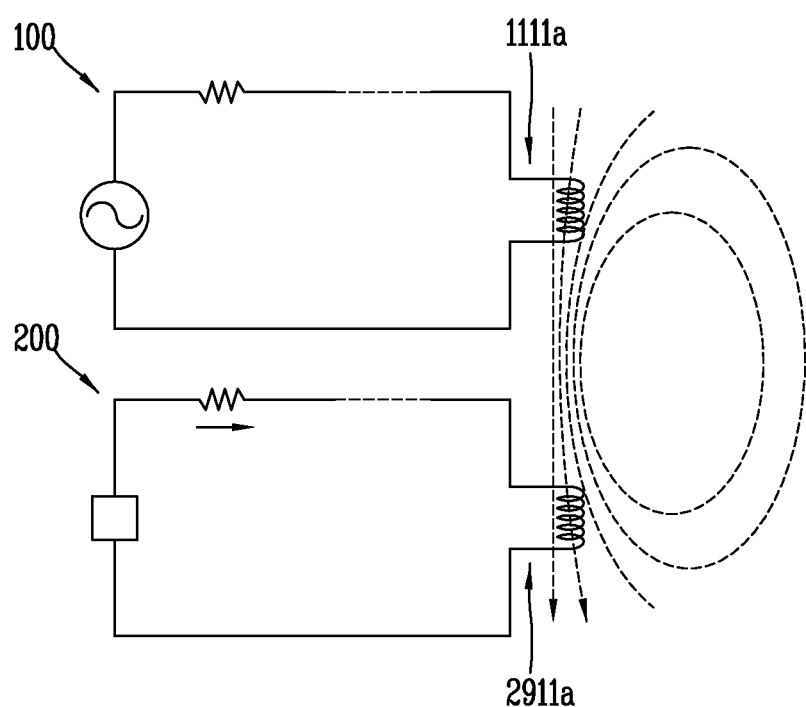
FIG. 3 illustrates a concept in which power is wirelessly transferred from a wireless power transfer apparatus to a wireless power receiving apparatus according to an inductive coupling scheme.

FIG. 3 is a view illustrating a concept in which power is transferred from a wireless power transmitter to an electronic device in a wireless manner according to an inductive coupling method.

When the power of the wireless power transmitter 100 is transferred in an inductive coupling method, if the strength of a current flowing through a primary coil within the power transmission unit 110 is changed, then a magnetic field passing through the primary coil will be changed by the current. The changed magnetic field generates an induced electromotive force at a secondary coil in the wireless power receiver 200.

According to the foregoing method, the power conversion unit 111 of the wireless power transmitter 100 may include a transmitting (Tx) coil 1111*a* being operated as a primary coil in magnetic induction. Furthermore, the power receiving unit 291 of the wireless power receiver 200 may include a receiving (Rx) coil 2911*a* being operated as a secondary coil in magnetic induction.

First, the wireless power transmitter 100 and wireless power receiver 200 are disposed in such a manner that the transmitting coil 1111*a* at the side of the wireless power transmitter 100 and the receiving coil at the side of the wireless power receiver 200 are located adjacent to each other. Then, if the power transmission control unit 112 controls a current of the transmitting coil (Tx coil) 1111*a* to be changed, then the power receiving unit 291 controls power to be supplied to the wireless power receiver 200 using an electromotive force induced to the receiving coil (Rx coil) 2911*a*.

The efficiency of wireless power transfer by the inductive coupling method may be little affected by a frequency characteristic, but affected by an alignment and distance between the wireless power transmitter 100 and the wireless power receiver 200 including each coil.

On the other hand, in order to perform wireless power transfer in the inductive coupling method, the wireless power transmitter 100 may be configured to include an interface surface (not shown) in the form of a flat surface. One or more electronic devices may be placed at an upper portion of the interface surface, and the transmitting coil 1111*a* may be mounted at a lower portion of the interface surface. In this case, a vertical spacing is formed in a small-scale between the transmitting coil 1111*a* mounted at a lower portion of the interface surface and the receiving coil 2911*a* of the wireless power receiver 200 placed at an upper portion of the interface surface, and thus a distance between the coils becomes sufficiently small to efficiently implement contactless power transfer by the inductive coupling method.

Furthermore, an alignment indicator (not shown) indicating a location where the wireless power receiver 200 is to be placed at an upper portion of the interface surface. The alignment indicator indicates a location of the wireless power receiver 200 where an alignment between the transmitting coil 1111*a* mounted at a lower portion of the interface surface and the receiving coil 2911*a* can be suitably implemented. The alignment indicator may alternatively be simple marks, or may be formed in the form of a protrusion structure for guiding the location of the wireless power receiver 200.

Otherwise, the alignment indicator may be formed in the form of a magnetic body such as a magnet mounted at a lower portion of the interface surface, thereby guiding the coils to be suitably arranged by mutual magnetism to a magnetic body having an opposite polarity mounted within the wireless power receiver 200.

On the other hand, the wireless power transmitter 100 may be formed to include one or more transmitting coils. The wireless power transmitter 100 may selectively use some of coils suitably arranged with the receiving coil 2911*a* of the wireless power receiver 200 among the one or more transmitting coils to enhance the power transmission efficiency. The wireless power transmitter 100 including the one or more transmitting coils will be described later with reference to FIG. 5.

Hereinafter, configurations of the wireless power transmitter and electronic device using an inductive coupling method applicable to the embodiments disclosed herein will be described in detail.

Wireless Power Transmitter and Electronic Device in Inductive Coupling Method

Figure 4A:
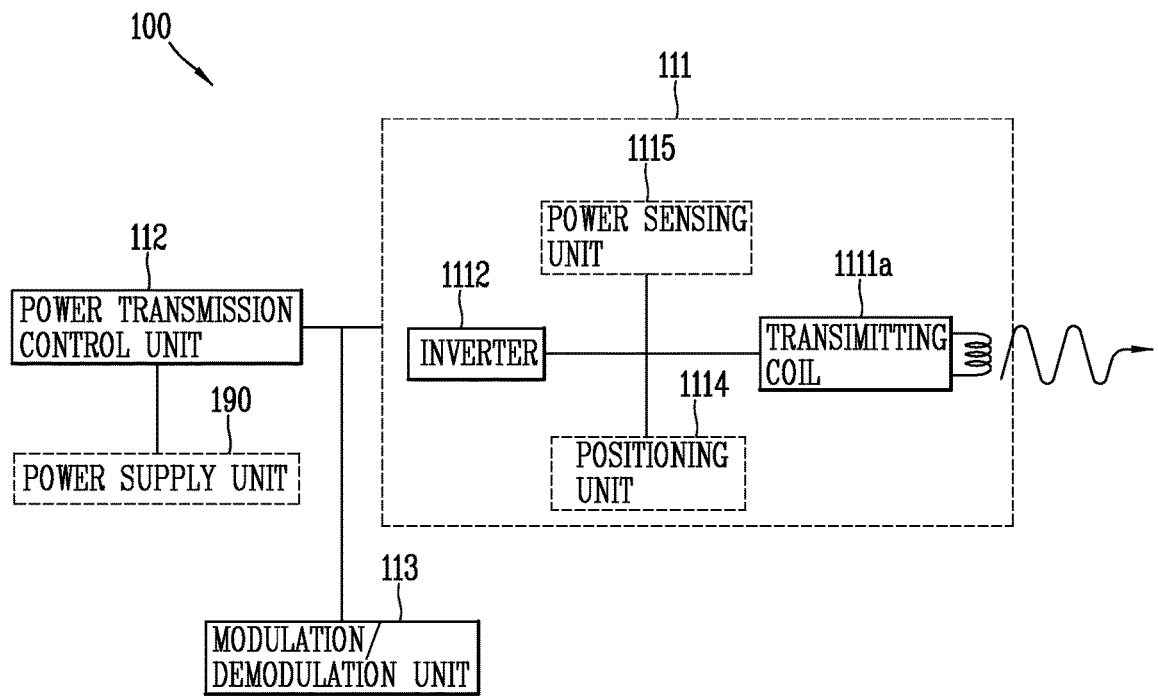
FIG. 4A is a block diagram exemplarily illustrating some elements of a wireless power transfer apparatus based on a magnetic induction scheme according to embodiments disclosed in the present specification.
Figure 4B:
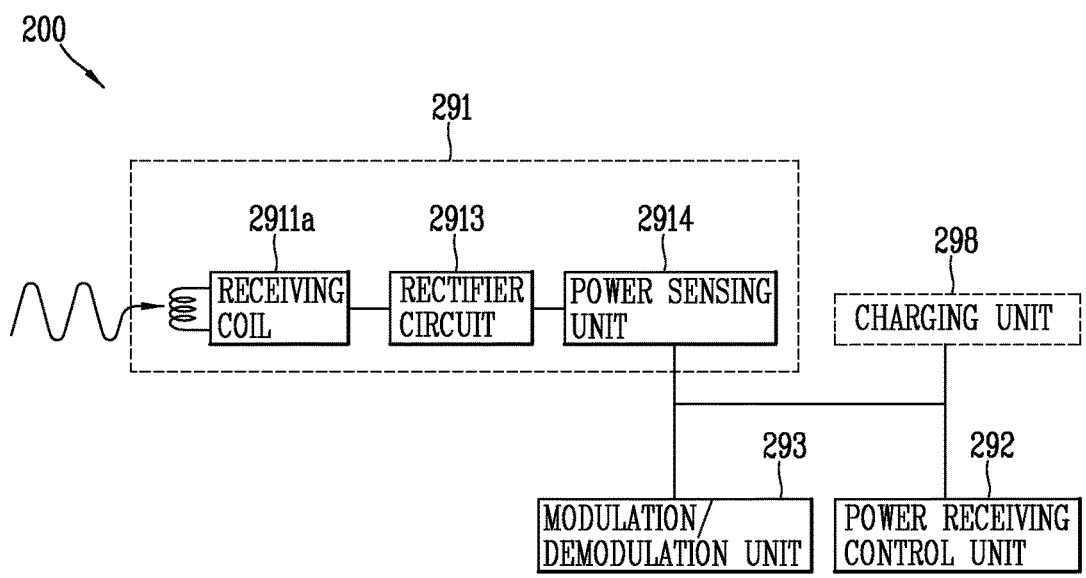
FIG. 4B is a block diagram exemplarily illustrating some elements of a wireless power receiving apparatus based on a magnetic induction scheme according to embodiments disclosed in the present specification.

FIGS. 4A and 4B are block diagrams illustrating part of the wireless power transmitter 100 and wireless power receiver 200 in a magnetic induction method that can be employed in the embodiments disclosed herein. A configuration of the power transmission unit 110 included in the wireless power transmitter 100 will be described with reference to FIG. 4A, and a configuration of the power supply unit 290 included in the wireless power receiver 200 will be described with reference to FIG. 4B.

Referring to FIG. 4A, the power conversion unit 111 of the wireless power transmitter 100 may include a transmitting (Tx) coil 1111*a* and an inverter 1112.

The transmitting coil 1111a may form a magnetic field corresponding to the wireless power signal according to a change of current as described above. The transmitting coil 1111a may alternatively be implemented with a planar spiral type or cylindrical solenoid type.

The inverter 1112 transforms a DC input obtained from the power supply unit 190 into an AC waveform. The AC current transformed by the inverter 1112 drives a resonant circuit including the transmitting coil 1111a and a capacitor (not shown) to form a magnetic field in the transmitting coil 1111a.

In addition, the power conversion unit 111 may further include a positioning unit 1114.

The positioning unit 1114 may move or rotate the transmitting coil 1111a to enhance the effectiveness of contactless power transfer using the inductive coupling method. As described above, it is because an alignment and distance between the wireless power transmitter 100 and the wireless power receiver 200 including a primary coil and a secondary coil may affect power transfer using the inductive coupling method. In particular, the positioning unit 1114 may be used when the wireless power receiver 200 does not exist within an active area of the wireless power transmitter 100.

Accordingly, the positioning unit 1114 may include a drive unit (not shown) for moving the transmitting coil 1111a such that a center-to-center distance of the transmitting coil 1111a of the wireless power transmitter 100 and the receiving coil 2911a of the wireless power receiver 200 is within a predetermined range, or rotating the transmitting coil 1111a such that the centers of the transmitting coil 1111a and the receiving coil 2911a are overlapped with each other.

For this purpose, the wireless power transmitter 100 may further include a detection unit (not shown) made of a sensor for detecting the location of the wireless power receiver 200, and the power transmission control unit 112 may control the positioning unit 1114 based on the location information of the wireless power receiver 200 received from the location detection sensor.

Furthermore, to this end, the power transmission control unit 112 may receive control information on an alignment or distance to the wireless power receiver 200 through the power communications modulation/demodulation unit 113, and control the positioning unit 1114 based on the received control information on the alignment or distance.

If the power conversion unit 111 is configured to include a plurality of transmitting coils, then the positioning unit 1114 may determine which one of the plurality of transmitting coils is to be used for power transmission.

The configuration of the wireless power transmitter 100 including the plurality of transmitting coils will be described later with reference to FIG. 5.

On the other hand, the power conversion unit 111 may further include a power sensing unit 1115. The power sensing unit 1115 at the side of the wireless power transmitter 100 monitors a current or voltage flowing into the transmitting coil 1111a. The power sensing unit 1115 is provided to check whether or not the wireless power transmitter 100 is normally operated, and thus the power sensing unit 1115 may detect a voltage or current of the power supplied from the outside, and check whether the detected voltage or current exceeds a threshold value. The power sensing unit 1115, although not shown, may include a resistor for detecting a voltage or current of the power supplied from the outside and a comparator for comparing a voltage value or current value of the detected power with a threshold value to output the comparison result. Based on the check result of the power sensing unit 1115, the power transmission control unit 112 may control a switching unit (not shown) to cut off power applied to the transmitting coil 1111a.

Referring to FIG. 4B, the power supply unit 290 of the wireless power receiver 200 may include a receiving (Rx) coil 2911a and a rectifier 2913.

A current is induced into the receiving coil 2911a by a change of the magnetic field formed in the transmitting coil 1111a. The implementation type of the receiving coil 2911a may be a planar spiral type or cylindrical solenoid type similarly to the transmitting coil 1111a.

Furthermore, series and parallel capacitors may be configured to be connected to the receiving coil 2911a to enhance the effectiveness of wireless power reception or perform resonant detection.

The receiving coil 2911a may be in the form of a single coil or a plurality of coils.

The rectifier 2913 performs a full-wave rectification to a current to convert alternating current into direct current. The rectifier 2913, for instance, may be implemented with a full-bridge rectifier made of four diodes or a circuit using active components.

In addition, the rectifier 2913 may further include a regulator for converting a rectified current into a more flat and stable direct current.

Furthermore, the output power of the rectifier 2913 is supplied to each constituent element of the power supply unit 290. Furthermore, the rectifier 2913 may further include a DC-DC converter for converting output DC power into a suitable voltage to adjust it to the power required for each constituent element (for instance, a circuit such as a charger 298).

The power communications modulation/demodulation unit 293 may be connected to the power receiving unit 291, and may be configured with a resistive element in which resistance varies with respect to direct current, and may be configured with a capacitive element in which reactance varies with respect to alternating current. The power reception control unit 292 may change the resistance or reactance of the power communications modulation/demodulation unit 293 to modulate a wireless power signal received to the power receiving unit 291.

On the other hand, the power supply unit 290 may further include a power sensing unit 2914. The power sensing unit 2914 at the side of the wireless power receiver 200 monitors a voltage and/or current of the power rectified by the rectifier 2913, and if the voltage and/or current of the rectified power exceeds a threshold value as a result of monitoring, then the power reception control unit 292 transmits a power control message to the wireless power transmitter 100 to transfer suitable power.

Wireless Power Transmitter Configured to Include One or More Transmitting Coils

Figure 5:
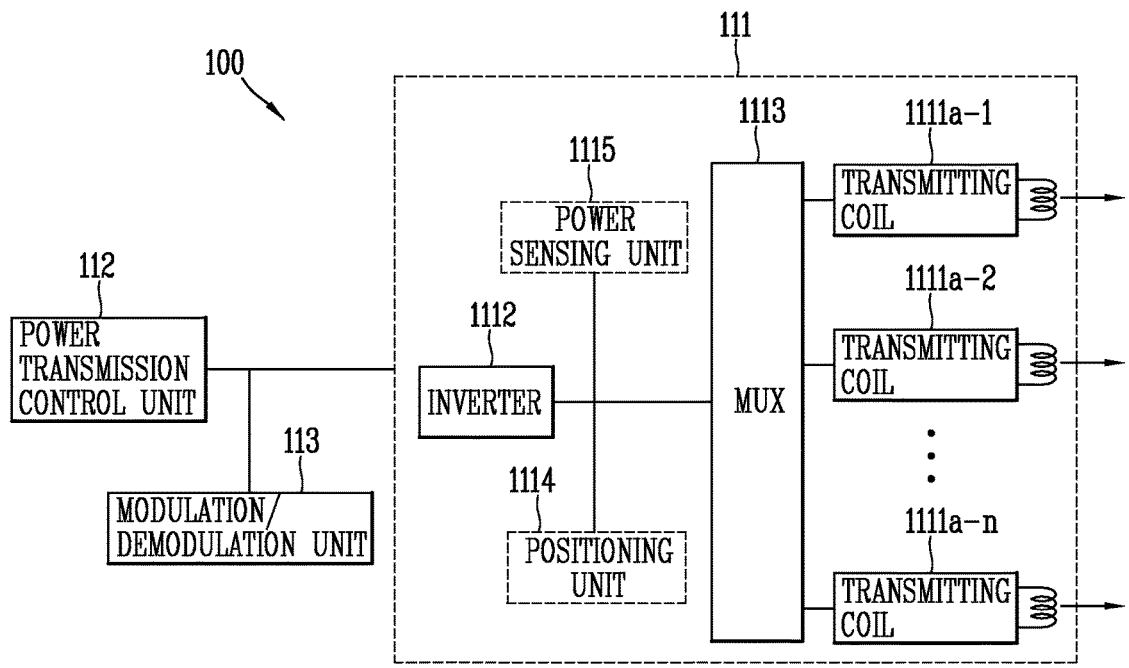
FIG. 5 is a block diagram of a wireless power transfer apparatus including one or more transmission coils receiving power in an inductive coupling scheme, according to embodiments disclosed in the present specification.

FIG. 5 is a block diagram illustrating a wireless power transmitter configured to have one or more transmission coils receiving power according to an inductive coupling method that can be employed in the embodiments disclosed herein.

Referring to FIG. 5, the power conversion unit 111 of the wireless power transmitter 100 according to the embodiments disclosed herein may include one or more transmitting coils 1111a-1 to 1111a-n. The one or more transmitting coils 1111a-1 to 1111a-n may be an array of partly overlapping primary coils. An active area may be determined by some of the one or more transmitting coils.

The one or more transmitting coils 1111a-1 to 1111a-n may be mounted at a lower portion of the interface surface.

Furthermore, the power conversion unit 111 may further include a multiplexer 1113 for establishing and releasing the connection of some of the one or more transmitting coils 1111a-1 to 1111a-n.

Upon detecting the location of the wireless power receiver 200 placed at an upper portion of the interface surface, the power transmission control unit 112 may take the detected location of the wireless power receiver 200 into consideration to control the multiplexer 1113, thereby allowing coils that can be placed in an inductive coupling relation to the receiving coil 2911a of the wireless power receiver 200 among the one or more transmitting coils 1111a-1 to 1111a-n to be connected to one another.

For this purpose, the power transmission control unit 112 may acquire the location information of the wireless power receiver 200. For example, the power transmission control unit 112 may acquire the location of the wireless power receiver 200 on the interface surface by the location detection unit (not shown) provided in the wireless power transmitter 100. For another example, the power transmission control unit 112 may alternatively receive a power control message indicating a strength of the wireless power signal from an object on the interface surface or a power control message indicating the identification information of the object using the one or more transmitting coils 1111a-1 to 1111a-n, respectively, and determines whether it is located adjacent to which one of the one or more transmitting coils based on the received result, thereby acquiring the location information of the wireless power receiver 200.

On the other hand, the active area as part of the interface surface may denote a portion through which a magnetic field with a high efficiency can pass when the wireless power transmitter 100 transfers power to the wireless power receiver 200 in a wireless manner. At this time, a single transmitting coil or a combination of one or more transmitting coils forming a magnetic field passing through the active area may be designated as a primary cell.

Accordingly, the power transmission control unit 112 may determine an active area based on the detected location of the wireless power receiver 200, and establish the connection of a primary cell corresponding to the active area to control the multiplexer 1113, thereby allowing the receiving coil 2911a of the wireless power receiver 200 and the coils belonging to the primary cell to be placed in an inductive coupling relation.

Furthermore, the power conversion unit 111 may further include an impedance matching unit (not shown) for controlling an impedance to form a resonant circuit with the coils connected thereto.

Hereinafter, a method for allowing a wireless power transmitter to transfer power according to a resonance coupling method will be disclosed with reference to FIGS. 6 through 8.

Resonance Coupling Method

Figure 6:
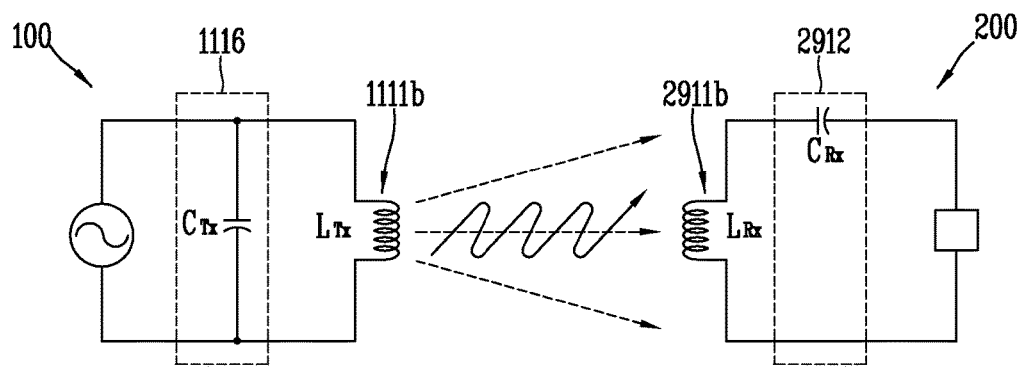
FIG. 6 illustrates a concept in which power is wirelessly transferred from a wireless power transfer apparatus to a wireless power receiving apparatus in a resonant coupling scheme.

FIG. 6 is a view illustrating a concept in which power is transferred to an electronic device from a wireless power transmitter in a wireless manner according to a resonance coupling method.

First, resonance will be described in brief as follows. Resonance refers to a phenomenon in which amplitude of vibration is remarkably increased when periodically receiving an external force having the same frequency as the natural frequency of a vibration system. Resonance is a phenomenon occurring at all kinds of vibrations such as mechanical vibration, electric vibration, and the like. Generally, when exerting a vibratory force to a vibration system from the outside, if the natural frequency thereof is the same as a frequency of the externally applied force, then the vibration becomes strong, thus increasing the width.

With the same principle, when a plurality of vibrating bodies separated from one another within a predetermined distance vibrate at the same frequency, the plurality of vibrating bodies resonate with one another, and in this case, resulting in a reduced resistance between the plurality of vibrating bodies. In an electrical circuit, a resonant circuit can be made by using an inductor and a capacitor.

When the wireless power transmitter 100 transfers power according to the inductive coupling method, a magnetic field having a specific vibration frequency is formed by alternating current power in the power transmission unit 110. If a resonance phenomenon occurs in the wireless power receiver 200 by the formed magnetic field, then power is generated by the resonance phenomenon in the wireless power receiver 200.

The resonant frequency may be determined by the following formula in Equation 1.

$$f = \frac{1}{2\pi\sqrt{LC}} \qquad \text{[Equation 1]}$$

Here, the resonant frequency (f) is determined by an inductance (L) and a capacitance (C) in a circuit. In a circuit forming a magnetic field using a coil, the inductance can be determined by a number of turns of the coil, and the like, and the capacitance can be determined by a gap between the coils, an area, and the like. In addition to the coil, a capacitive resonant circuit may be configured to be connected thereto to determine the resonant frequency.

Referring to FIG. 6, when power is transmitted in a wireless manner according to the resonance coupling method, the power conversion unit 111 of the wireless power transmitter 100 may include a transmitting (Tx) coil 1111b in which a magnetic field is formed and a resonant circuit 1116 connected to the transmitting coil 1111b to determine a specific vibration frequency. The resonant circuit 1116 may be implemented by using a capacitive circuit (capacitors), and the specific vibration frequency may be determined based on an inductance of the transmitting coil 1111b and a capacitance of the resonant circuit 1116.

The configuration of a circuit element of the resonant circuit 1116 may be implemented in various forms such that the power conversion unit 111 forms a magnetic field, and is not limited to a form of being connected in parallel to the transmitting coil 1111b as illustrated in FIG. 6.

Furthermore, the power receiving unit 291 of the wireless power receiver 200 may include a resonant circuit 2912 and a receiving (Rx) coil 2911b to generate a resonance phenomenon by a magnetic field formed in the wireless power transmitter 100. In other words, the resonant circuit 2912 may be also implemented by using a capacitive circuit, and the resonant circuit 2912 is configured such that a resonant frequency determined based on an inductance of the receiving coil 2911b and a capacitance of the resonant circuit 2912 has the same frequency as a resonant frequency of the formed magnetic field.

The configuration of a circuit element of the resonant circuit 2912 may be implemented in various forms such that the power receiving unit 291 generates resonance by a magnetic field, and is not limited to a form of being connected in series to the receiving coil 2911b as illustrated in FIG. 6.

The specific vibration frequency in the wireless power transmitter 100 may have LTX, CTX, and may be acquired by using the Equation 1. Here, the wireless power receiver 200 generates resonance when a result of substituting the LRX and CRX of the wireless power receiver 200 to the Equation 1 is same as the specific vibration frequency.

According to a contactless power transfer method by resonance coupling, when the wireless power transmitter 100 and wireless power receiver 200 resonate at the same frequency, respectively, an electromagnetic wave is propagated through a short-range magnetic field, and thus there exists no energy transfer between the devices if they have different frequencies.

As a result, an efficiency of contactless power transfer by the resonance coupling method is greatly affected by a frequency characteristic, whereas the effect of an alignment and distance between the wireless power transmitter 100 and the wireless power receiver 200 including each coil is relatively smaller than the inductive coupling method.

Hereinafter, the configuration of a wireless power transmitter and an electronic device in the resonance coupling method applicable to the embodiments disclosed herein will be described in detail.

Wireless Power Transmitter in Resonance Coupling Method

Figure 7A:
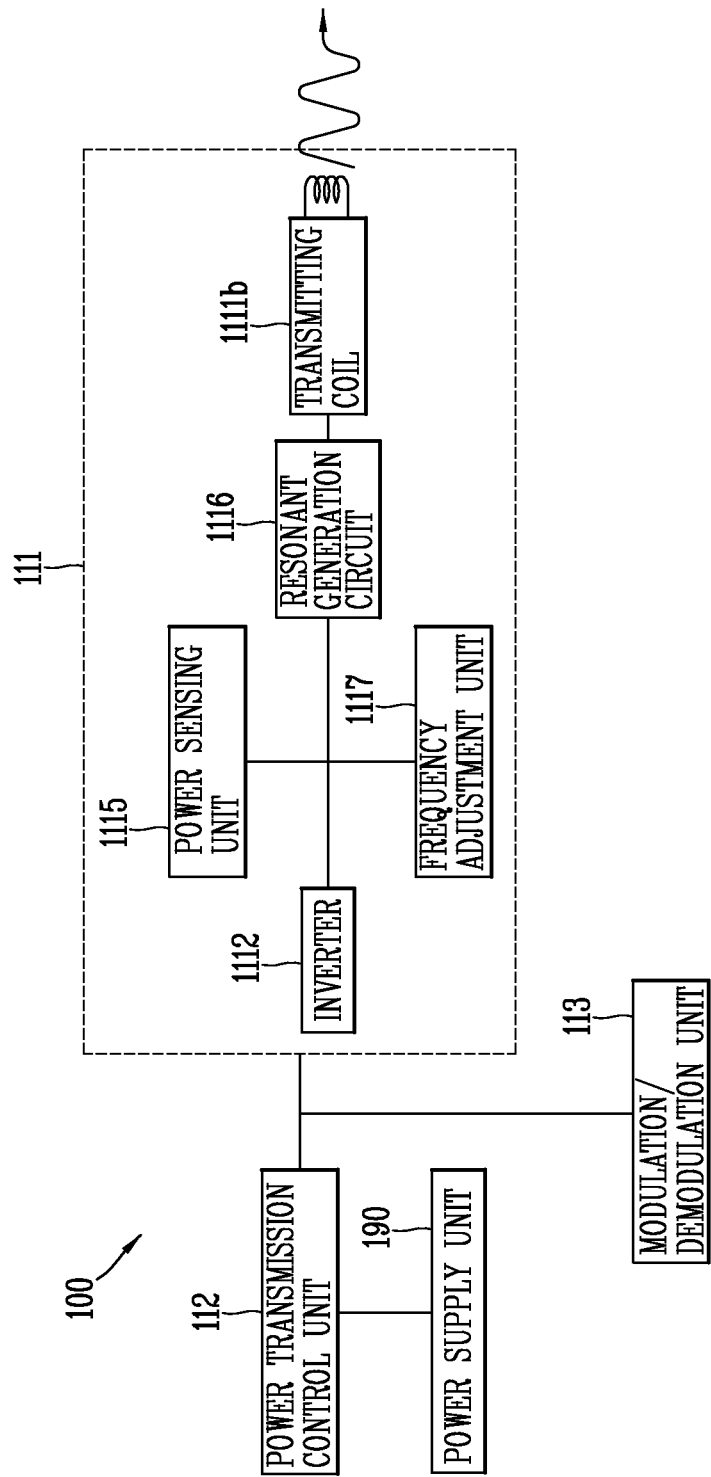
FIG. 7A is a block diagram exemplarily illustrating some elements of a wireless power transfer apparatus based on a resonant scheme according to embodiments disclosed in the present specification.
Figure 7B:
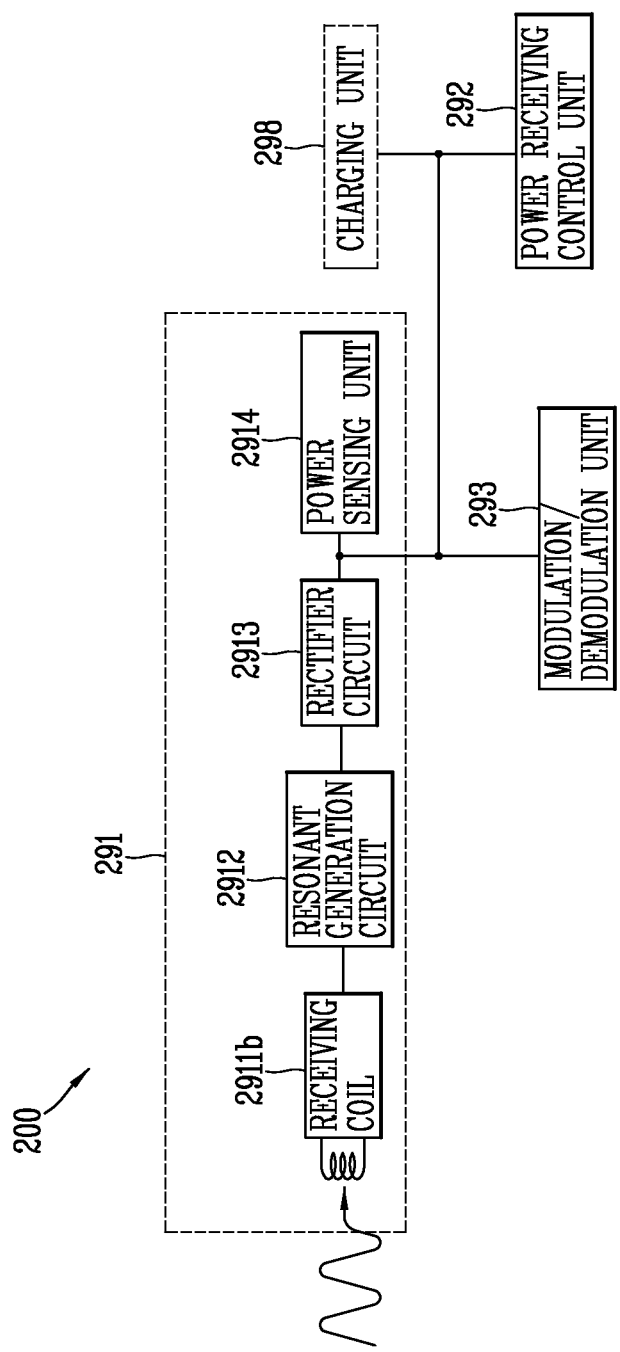
FIG. 7B is a block diagram exemplarily illustrating some elements of a wireless power receiving apparatus based on a resonant scheme according to embodiments disclosed in the present specification.

FIGS. 7A and 7B are block diagrams illustrating part of the wireless power transmitter 100 and wireless power receiver 200 in a resonance method that can be employed in the embodiments disclosed herein.

A configuration of the power transmission unit 110 included in the wireless power transmitter 100 will be described with reference to FIG. 7A.

The power conversion unit 111 of the wireless power transmitter 100 may include a transmitting (Tx) coil 1111b, an inverter 1112, and a resonant circuit 1116. The inverter 1112 may be configured to be connected to the transmitting coil 1111b and the resonant circuit 1116.

The transmitting coil 1111b may be mounted separately from the transmitting coil 1111a for transferring power according to the inductive coupling method, but may transfer power in the inductive coupling method and resonance coupling method using one single coil.

The transmitting coil 1111b, as described above, forms a magnetic field for transferring power. The transmitting coil 1111b and the resonant circuit 1116 generate resonance when alternating current power is applied thereto, and at this time, a vibration frequency may be determined based on an inductance of the transmitting coil 1111b and a capacitance of the resonant circuit 1116.

For this purpose, the inverter 1112 transforms a DC input obtained from the power supply unit 190 into an AC waveform, and the transformed AC current is applied to the transmitting coil 1111b and the resonant circuit 1116.

In addition, the power conversion unit 111 may further include a frequency adjustment unit 1117 for changing a resonant frequency of the power conversion unit 111. The resonant frequency of the power conversion unit 111 is determined based on an inductance and/or capacitance within a circuit constituting the power conversion unit 111 by Equation 1, and thus the power transmission control unit 112 may determine the resonant frequency of the power conversion unit 111 by controlling the frequency adjustment unit 1117 to change the inductance and/or capacitance.

The frequency adjustment unit 1117, for example, may be configured to include a motor for adjusting a distance between capacitors included in the resonant circuit 1116 to change a capacitance, or include a motor for adjusting a number of turns or diameter of the transmitting coil 1111b to change an inductance, or include active elements for determining the capacitance and/or inductance On the other hand, the power conversion unit 111 may further include a power sensing unit 1115. The operation of the power sensing unit 1115 is the same as the foregoing description.

Referring to FIG. 7B, a configuration of the power supply unit 290 included in the wireless power receiver 200 will be described. The power supply unit 290, as described above, may include the receiving (Rx) coil 2911b and resonant circuit 2912.

In addition, the power receiving unit 291 of the power supply unit 290 may further include a rectifier 2913 for converting an AC current generated by resonance phenomenon into DC. The rectifier 2913 may be configured similarly to the foregoing description.

Furthermore, the power receiving unit 291 may further include a power sensing unit 2914 for monitoring a voltage and/or current of the rectified power. The power sensing unit 2914 may be configured similarly to the foregoing description.

Wireless power transmitter configured to include one or more transmitting coils

Figure 8:
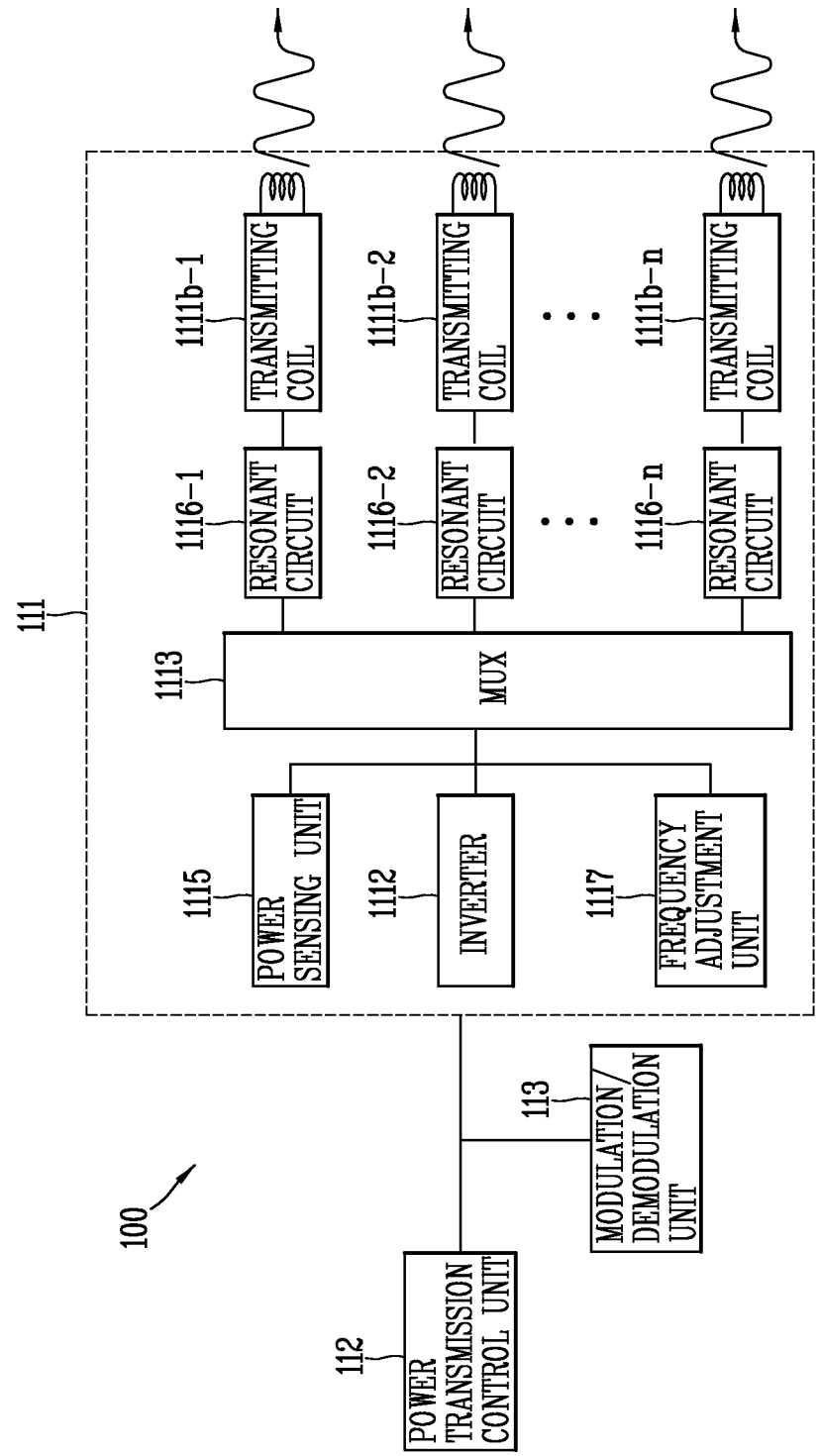
FIG. 8 is a block diagram of a wireless power transfer apparatus including one or more transmission coils receiving power in a resonant coupling scheme, according to embodiments disclosed in the present specification.

FIG. 8 is a block diagram illustrating a wireless power transmitter configured to have one or more transmission coils receiving power according to a resonance coupling method that can be employed in the embodiments disclosed herein.

Referring to FIG. 8, the power conversion unit 111 of the wireless power transmitter 100 according to the embodiments disclosed herein may include one or more transmitting coils 1111b-1 to 1111b-n and resonant circuits (1116-1 to 1116-n) connected to each transmitting coils.

Furthermore, the power conversion unit 111 may further include a multiplexer 1113 for establishing and releasing the connection of some of the one or more transmitting coils 1111b-1 to 1111b-n.

The one or more transmitting coils 1111b-1 to 1111b-n may be configured to have the same vibration frequency, or some of them may be configured to have different vibration frequencies. It is determined by an inductance and/or capacitance of the resonant circuits (1116-1 to 1116-n) connected to the one or more transmitting coils 1111b-1 to 1111b-n, respectively.

For this purpose, the frequency adjustment unit 1117 may be configured to change an inductance and/or capacitance of the resonant circuits (1116-1 to 1116-n) connected to the one or more transmitting coils 1111b-1 to 1111b-n, respectively.

In-Band Communication

Figure 9:
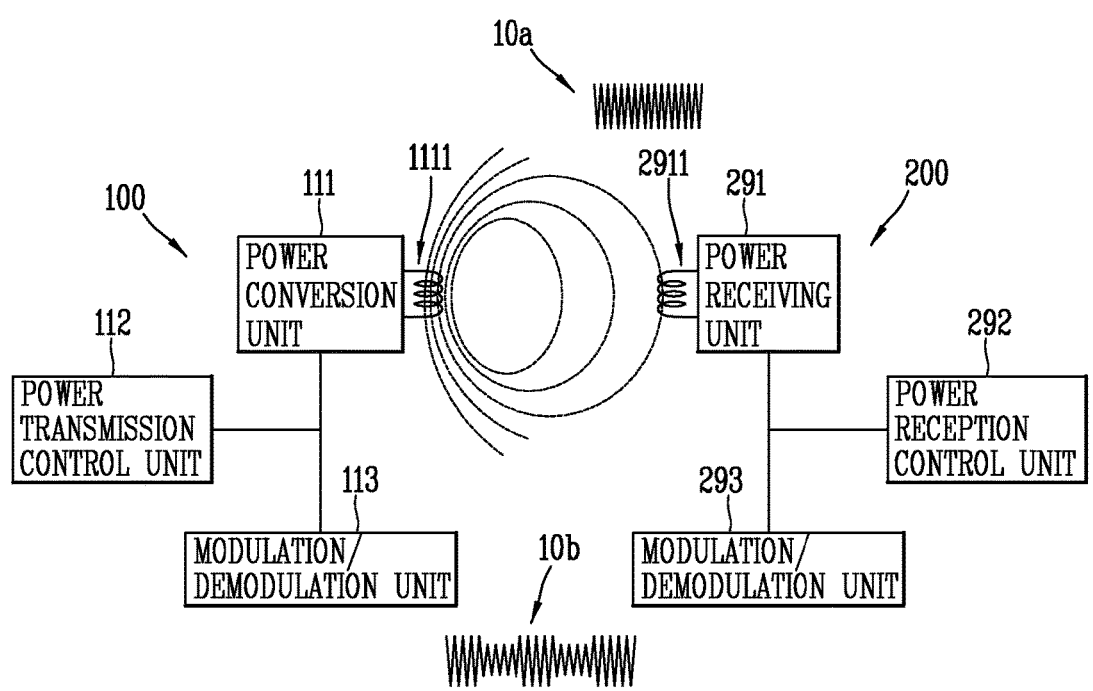
FIG. 9 illustrates a concept in which a packet is transmitted and received between a wireless power transfer apparatus and an electronic device through modulation and demodulation of a wireless power signal in wirelessly transferring power, according to embodiments disclosed in the present specification.

FIG. 9 a view illustrating the concept of transmitting and receiving a packet between a wireless power transmitter and a wireless power receiver through the modulation and demodulation of a wireless power signal in transferring power in a wireless manner disclosed herein.

As illustrated in FIG. 9, the power conversion unit 111 included in the wireless power transmitter 100 may generate a wireless power signal. The wireless power signal may be generated through the transmitting coil 1111 included in the power conversion unit 111.

The wireless power signal 10a generated by the power conversion unit 111 may arrive at the wireless power receiver 200 so as to be received through the power receiving unit 291 of the wireless power receiver 200. The generated wireless power signal may be received through the receiving coil 2911 included in the power receiving unit 291.

The power reception control unit 292 may control the modulation/demodulation unit 293 connected to the power receiving unit 291 to modulate the wireless power signal while the wireless power receiver 200 receives the wireless power signal. When the received wireless power signal is modulated, the wireless power signal may form a closed-loop within a magnetic field or an electro-magnetic field. This may allow the wireless power transmitter 100 to sense a modulated wireless power signal 10b. The modulation/demodulation unit 113 may demodulate the sensed wireless power signal and decode the packet from the demodulated wireless power signal.

The modulation method employed for the communication between the wireless power transmitter 100 and the wireless power receiver 200 may be an amplitude modulation. As aforementioned, the amplitude modulation is a backscatter modulation may be a backscatter modulation method in which the power communications modulation/demodulation unit 293 at the side of the wireless power receiver 200 changes an amplitude of the wireless power signal 10a formed by the power conversion unit 111 and the power reception control unit 292 at the side of the wireless power transmitter 100 detects an amplitude of the modulated wireless power signal 10b.

Modulation and Demodulation of Wireless Power Signal

Hereinafter, description will be given of modulation and demodulation of a packet, which is transmitted or received between the wireless power transmitter 100 and the wireless power receiver 200 with reference to FIGS. 10, 11A, 11B and 11C.

Figure 10:
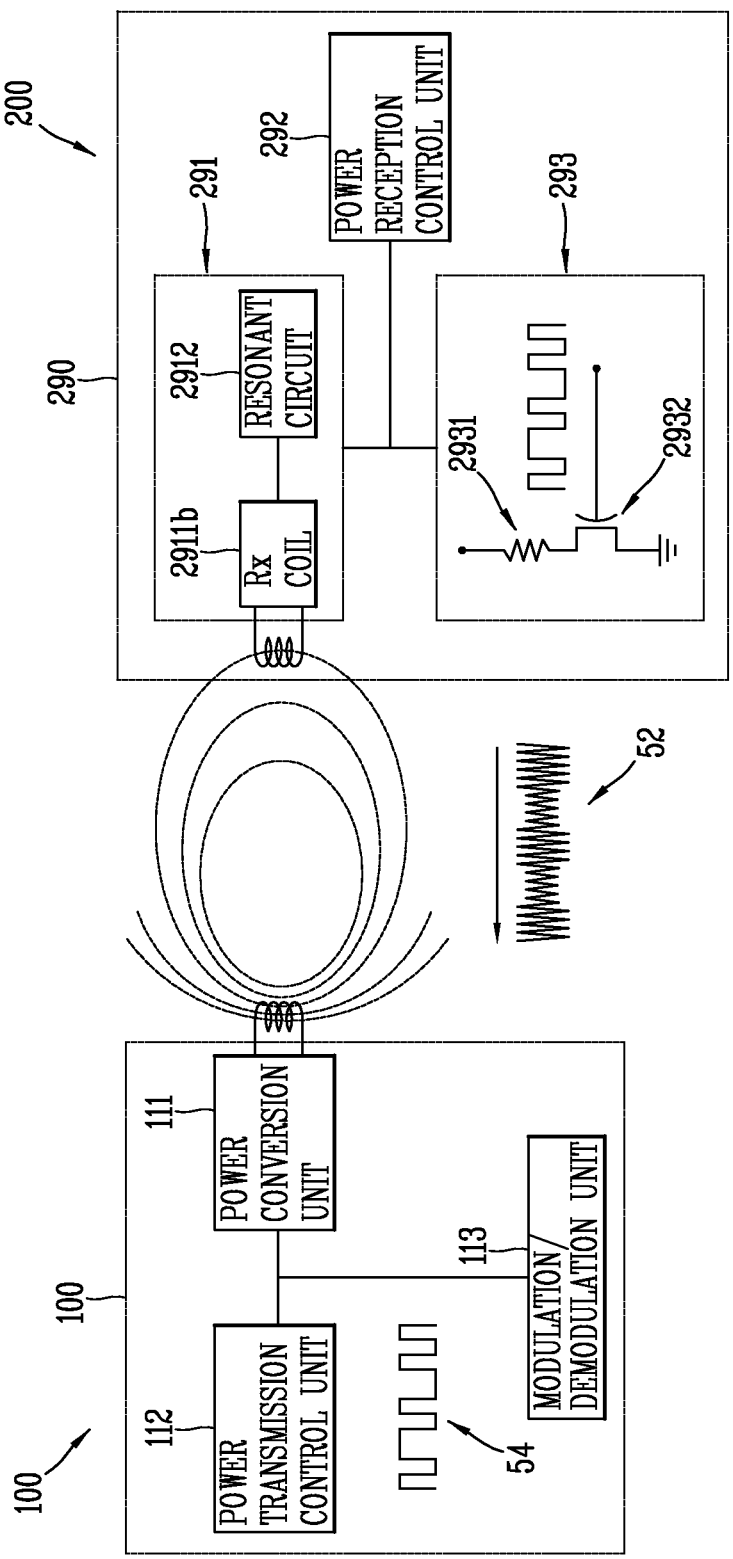
FIG. 10 illustrates a configuration for transmitting and receiving a power control message in wirelessly transferring power, according to embodiments disclosed in the present specification.
Figure 11A:
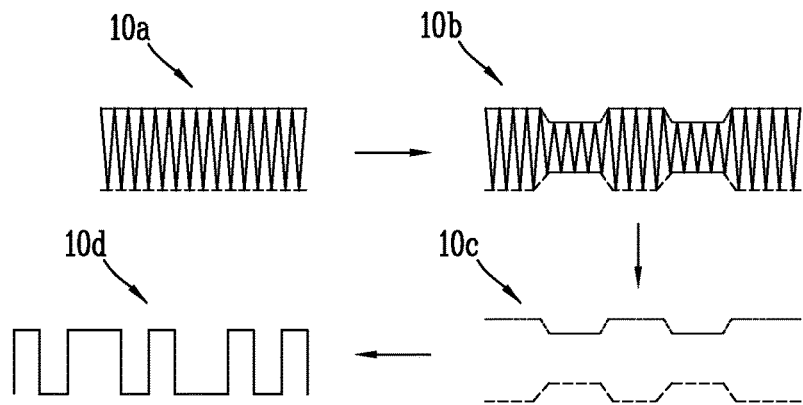
FIG. 11A, FIG. 11B and FIG. 11C illustrate the form of a signal in modulation and demodulation performed in wirelessly transferring power, according to embodiments disclosed in the present specification.
Figure 11B:
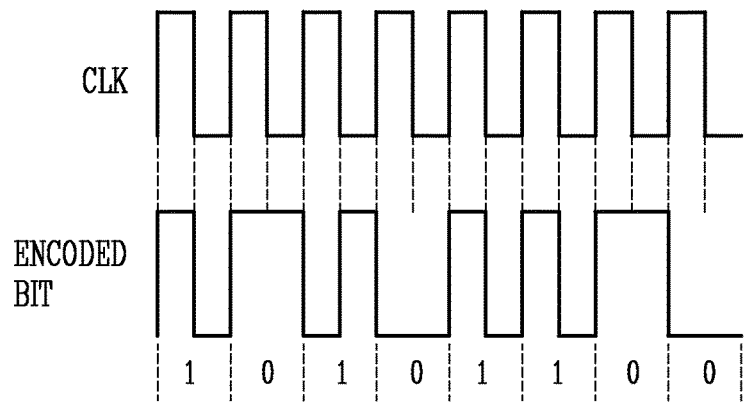
Figure 11C:
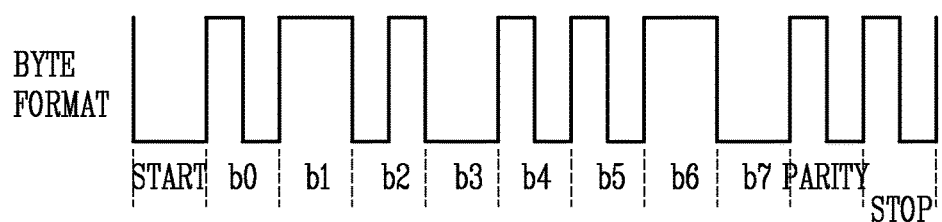

FIG. 10 is a view illustrating a configuration of transmitting or receiving a power control message in transferring power in a wireless manner disclosed herein, and FIGS. 11A, 11B and 11C are view illustrating forms of signals upon modulation and demodulation executed in the wireless power transfer disclosed herein.

Referring to FIG. 10, the wireless power signal received through the power receiving unit 291 of the wireless power receiver 200, as illustrated in FIG. 11A, may be a non-modulated wireless power signal 51. The wireless power receiver 200 and the wireless power transmitter 100 may establish a resonance coupling according to a resonant frequency, which is set by the resonant circuit 2912 within the power receiving unit 291, and the wireless power signal 51 may be received through the receiving coil 2911b.

The power reception control unit 292 may modulate the wireless power signal 51 received through the power receiving unit 291 by changing a load impedance within the modulation/demodulation unit 293. The modulation/demodulation unit 293 may include a passive element 2931 and an active element 2932 for modulating the wireless power signal 51. The modulation/demodulation unit 293 may modulate the wireless power signal 51 to include a packet, which is desired to be transmitted to the wireless power transmitter 100. Here, the packet may be input into the active element 2932 within the modulation/demodulation unit 293.

Afterwards, the power transmission control unit 112 of the wireless power transmitter 100 may demodulate a modulated wireless power signal 52 through an envelop detection, and decode the detected signal 53 into digital data 54. The demodulation may detect a current or voltage flowing into the power conversion unit 111 to be classified into two phases, a HI phase and a LO phase, and acquire a packet to be transmitted by the wireless power receiver 200 based on digital data classified according to the phases.

Hereinafter, a process of allowing the wireless power transmitter 100 to acquire a power control message to be transmitted by the wireless power receiver 200 from the demodulated digital data will be described.

Referring to FIG. 11B, the power transmission control unit 112 detects an encoded bit using a clock signal (CLK) from an envelope detected signal.

The detected encoded bit is encoded according to a bit encoding method used in the modulation process at the side of the wireless power receiver 200. The bit encoding method may correspond to any one of non-return to zero (NRZ) and bi-phase encoding.

For instance, the detected bit may be a differential bi-phase (DBP) encoded bit. According to the DBP encoding, the power reception control unit 292 at the side of the wireless power receiver 200 is allowed to have two state transitions to encode data bit 1, and to have one state transition to encode data bit 0. In other words, data bit 1 may be encoded in such a manner that a transition between the HI phase and LO phase is generated at a rising edge and falling edge of the clock signal, and data bit 0 may be encoded in such a manner that a transition between the HI phase and LO phase is generated at a rising edge of the clock signal.

On the other hand, the power transmission control unit 112 may acquire data in a byte unit using a byte format constituting a packet from a bit string detected according to the bit encoding method. For instance, the detected bit string may be transferred by using an 11-bit asynchronous serial format as illustrated in FIG. 11C. In other words, the detected bit may include a start bit indicating the beginning of a byte and a stop bit indicating the end of a byte, and also include data bits (b0 to b7) between the start bit and the stop bit. Furthermore, it may further include a parity bit for checking an error of data. The data in a byte unit constitutes a packet including a power control message.

[For Supporting in-Band Two-Way Communication]

As aforementioned, FIG. 9 has illustrated that the wireless power receiver 200 transmits a packet using a carrier signal 10a formed by the wireless power transmitter 100. However, the wireless power transmitter 100 may also transmit data to the wireless power receiver 200 by a similar method.

That is, the power transmission control unit 112 may control the modulation/demodulation unit 113 to modulate data, which is to be transmitted to the wireless power receiver 200, such that the data can be included in the carrier signal 10a. Here, the power reception control unit 292 of the wireless power receiver 200 may control the modulation/demodulation unit 293 to execute demodulation so as to acquire data from the modulated carrier signal 10a.

Packet Format

Hereinafter, description will be given of a structure of a packet used in communication using a wireless power signal according to the exemplary embodiments disclosed herein.

Figure 12A:
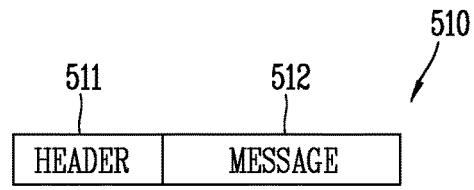
FIG. 12A, FIG. 12B and FIG. 12C illustrate a packet including a power control message used in a wireless power transfer method according to embodiments disclosed in the present specification.
Figure 12B:
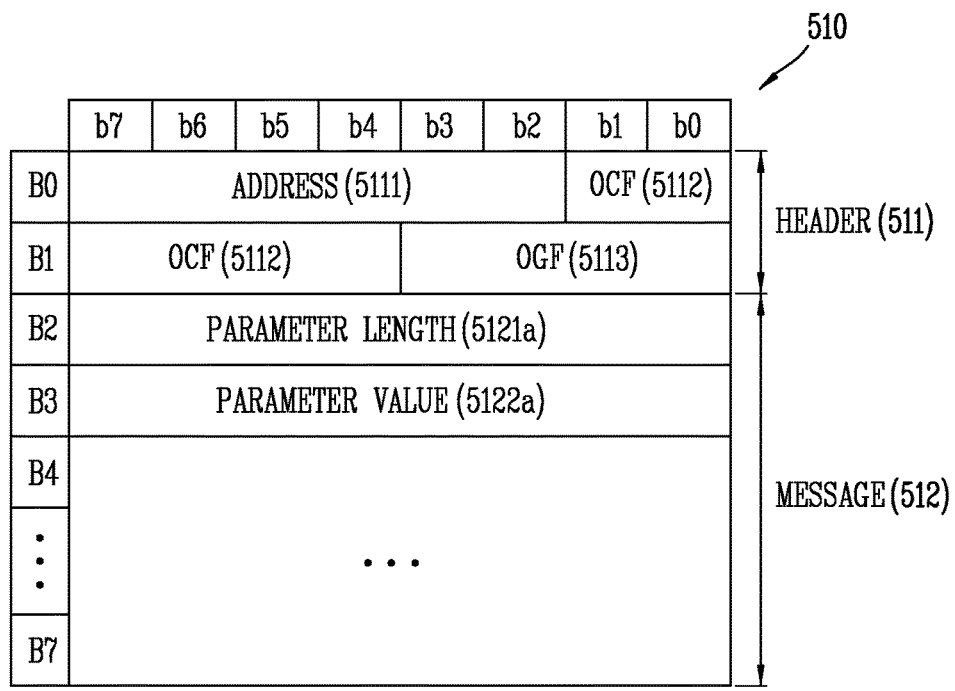
Figure 12C:
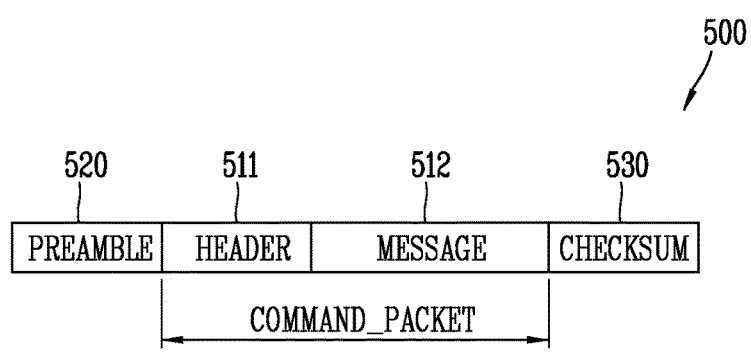

FIGS. 12A, 12B and 12C are view illustrating a packet including a power control message used in a contactless (wireless) power transfer method according to the embodiments disclosed herein.

As illustrated in FIG. 12A, the wireless power transmitter 100 and the wireless power receiver 200 may transmit and receive data desired to transmit in a form of a command packet (command_packet) 510. The command packet 510 may include a header 511 and a message 512.

The header 511 may include a field indicating a type of data included in the message 512. Size and type of the message may be decided based on a value of the field which indicates the type of data.

The header 511 may include an address field for identifying a transmitter (originator) of the packet. For example, the address field may indicate an identifier of the wireless power receiver 200 or an identifier of a group to which the wireless power receiver 200 belongs. When the wireless power receiver 200 transmits the packet 510, the wireless power receiver 200 may generate the packet 510 such that the address field can indicate identification information related to the receiver 200 itself.

The message 512 may include data that the originator of the packet 510 desires to transmit. The data included in the message 512 may be a report, a request or a response for the other party.

According to one exemplary embodiment, the command packet 510 may be configured as illustrated in FIG. 12B. The header 511 included in the command packet 510 may be represented with a predetermined size. For example, the header 511 may have a 2-byte size.

The header 511 may include a reception address field. For example, the reception address field may have a 6-bit size.

The header 511 may include an operation command field (OCF) or an operation group field (OGF). The OGF is a value given for each group of commands for the wireless power receiver 200, and the OCF is a value given for each command existing in each group in which the wireless power receiver 200 is included.

The message 512 may be divided into a length field 5121 of a parameter and a value field 5122 of the parameter. That is, the originator of the packet 510 may generate the message by a length-value pair (5121a-5122a, etc.) of at least one parameter, which is required to represent data desired to transmit.

Referring to FIG. 12C, the wireless power transmitter 100 and the wireless power receiver 200 may transmit and receive the data in a form of a packet which further has a preamble 520 and a checksum 530 added to the command packet 510.

The preamble 520 may be used to perform synchronization with data received by the wireless power transmitter 100 and detect the start bit of the header 520. The preamble 520 may be configured to repeat the same bit.

For instance, the preamble 520 may be configured such that data bit 1 according to the DBP encoding is repeated eleven to twenty five times.

The checksum 530 may be used to detect an error that can be occurred in the command packet 510 while transmitting a power control message.

Operation Phases

Hereinafter, description will be given of operation phases of the wireless power transmitter 100 and the wireless power receiver 200.

Figure 13:
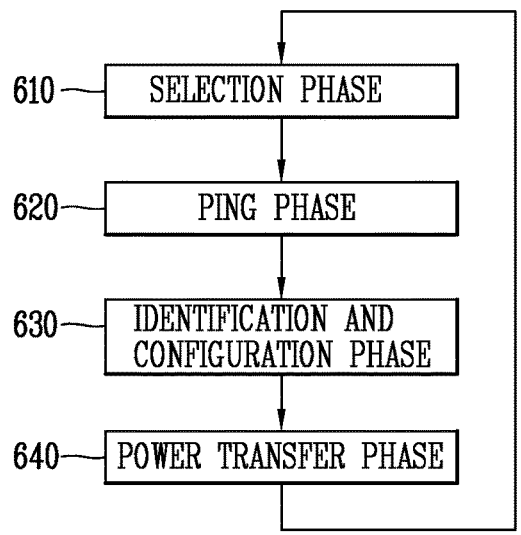
FIG. 13 illustrates the operating states of a wireless power transfer apparatus and a wireless power receiving apparatus according to embodiments disclosed in the present specification.

FIG. 13 illustrates the operation phases of the wireless power transmitter 100 and the wireless power receiver 200 according to the embodiments disclosed herein. Furthermore, FIGS. 14 to 18 illustrate the structures of packets including a power control message between the wireless power transmitter 100 and the wireless power receiver 200.

Referring to FIG. 13, the operation phases of the wireless power transmitter 100 and the wireless power receiver 200 for wireless power transfer may be divided into a selection phase (state) 610, a ping phase 620, an identification and configuration phase 630, and a power transfer phase 640.

The wireless power transmitter 100 detects whether or not objects exist within a range that the wireless power transmitter 100 can transmit power in a wireless manner in the selection phase 610, and the wireless power transmitter 100 sends a detection signal to the detected object and the wireless power receiver 200 sends a response to the detection signal in the ping phase 620.

Furthermore, the wireless power transmitter 100 identifies the wireless power receiver 200 selected through the previous phases and acquires configuration information for power transmission in the identification and configuration phase 630. The wireless power transmitter 100 transmits power to the wireless power receiver 200 while controlling power transmitted in response to a control message received from the wireless power receiver 200 in the power transfer phase 640.

Hereinafter, each of the operation phases will be described in detail.

1) Selection Phase

The wireless power transmitter 100 in the selection phase 610 performs a detection process to select the wireless power receiver 200 existing within a detection area. The detection area, as described above, refers to a region in which an object within the relevant area can affect on the characteristic of the power of the power conversion unit 111. Compared to the ping phase 620, the detection process for selecting the wireless power receiver 200 in the selection phase 610 is a process of detecting a change of the power amount for forming a wireless power signal in the power conversion unit at the side of the wireless power transmitter 100 to check whether any object exists within a predetermined range, instead of the scheme of receiving a response from the wireless power receiver 200 using a power control message.

The detection process in the selection phase 610 may be referred to as an analog ping process in the aspect of detecting an object using a wireless power signal without using a packet in a digital format in the ping phase 620 which will be described later.

The wireless power transmitter 100 in the selection phase 610 can detect that an object comes in or out within the detection area. Furthermore, the wireless power transmitter 100 can distinguish the wireless power receiver 200 capable of transferring power in a wireless manner from other objects (for example, a key, a coin, etc.) among objects located within the detection area.

As described above, a distance that can transmit power in a wireless manner may be different according to the inductive coupling method and resonance coupling method, and thus the detection area for detecting an object in the selection phase 610 may be different from one another.

First, in case where power is transmitted according to the inductive coupling method, the wireless power transmitter 100 in the selection phase 610 can monitor an interface surface (not shown) to detect the alignment and removal of objects.

Furthermore, the wireless power transmitter 100 may detect the location of the wireless power receiver 200 placed on an upper portion of the interface surface. As described above, the wireless power transmitter 100 formed to include one or more transmitting coils may perform the process of entering the ping phase 620 in the selection phase 610, and checking whether or not a response to the detection signal is transmitted from the object using each coil in the ping phase 620 or subsequently entering the identification phase 630 to check whether identification information is transmitted from the object. The wireless power transmitter 100 may determine a coil to be used for contactless power transfer based on the detected location of the wireless power receiver 200 acquired through the foregoing process.

Furthermore, when power is transmitted according to the resonance coupling method, the wireless power transmitter 100 in the selection phase 610 can detect an object by detecting that any one of a frequency, a current and a voltage of the power conversion unit is changed due to an object located within the detection area.

On the other hand, the wireless power transmitter 100 in the selection phase 610 may detect an object by at least any one of the detection methods using the inductive coupling method and resonance coupling method. The wireless power transmitter 100 may perform an object detection process according to each power transmission method, and subsequently select a method of detecting the object from the coupling methods for contactless power transfer to advance to other phases 620, 630, 640.

On the other hand, for the wireless power transmitter 100, a wireless power signal formed to detect an object in the selection phase 610 and a wireless power signal formed to perform digital detection, identification, configuration and power transmission in the subsequent phases 620, 630, 640 may have a different characteristic in the frequency, strength, and the like.

It is because the selection phase 610 of the wireless power transmitter 100 corresponds to an idle state for detecting an object, thereby allowing the wireless power transmitter 100 to reduce consumption power in the idle state or generate a specialized signal for effectively detecting an object.

2) Ping Phase

The wireless power transmitter 100 in the ping phase 620 performs a process of detecting the wireless power receiver 200 existing within the detection area through a power control message. Compared to the detection process of the wireless power receiver 200 using a characteristic of the wireless power signal and the like in the selection phase 610, the detection process in the ping phase 620 may be referred to as a digital ping process.

The wireless power transmitter 100 in the ping phase 620 forms a wireless power signal to detect the wireless power receiver 200, modulates the wireless power signal modulated by the wireless power receiver 200, and acquires a power control message in a digital data format corresponding to a response to the detection signal from the modulated wireless power signal.

The wireless power transmitter 100 may receive a power control message corresponding to the response to the detection signal to recognize the wireless power receiver 200 which is a subject of power transmission.

The detection signal formed to allowing the wireless power transmitter 100 in the ping phase 620 to perform a digital detection process may be a wireless power signal formed by applying a power signal at a specific operating point for a predetermined period of time. The operating point may denote a frequency, duty cycle, and amplitude of the voltage applied to the transmitting (Tx) coil. The wireless power transmitter 100 may generate the detection signal generated by applying the power signal at a specific operating point for a predetermined period of time, and attempt to receive a power control message from the wireless power receiver 200.

Figure 14:
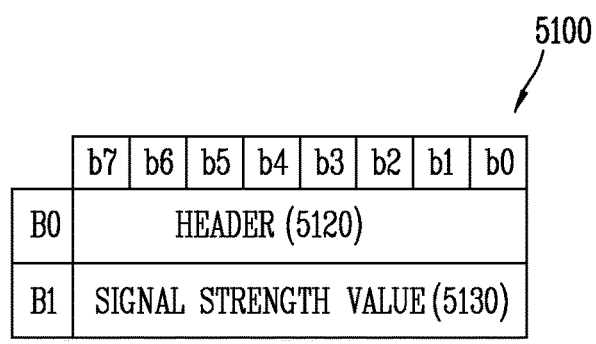
FIG. 14, FIG. 15A, FIG. 15B, FIG. 16, FIG. 17 and FIG. 18 illustrate structures of packets including a power control message between the wireless power transfer apparatus and the wireless power receiving apparatus.

On the other hand, the power control message corresponding to a response to the detection signal may be a message indicating strength of the wireless power signal received by the wireless power receiver 200. For example, the wireless power receiver 200 may transmit a signal strength packet 5100 including a message indicating the received strength of the wireless power signal as a response to the detection signal as illustrated in FIG. 14. The packet 5100 may include a header 5120 for notifying a packet indicating the signal strength and a message 5130 indicating strength of the power signal received by the wireless power receiver 200. The strength of the power signal within the message 5130 may be a value indicating a degree of inductive coupling or resonance coupling for power transmission between the wireless power transmitter 100 and the wireless power receiver 200.

The wireless power transmitter 100 may receive a response message to the detection signal to find the wireless power receiver 200, and then extend the digital detection process to enter the identification and configuration phase 630. In other words, the wireless power transmitter 100 maintains the power signal at a specific operating point subsequent to finding the wireless power receiver 200 to receive a power control message required in the identification and configuration phase 630.

However, if the wireless power transmitter 100 is not able to find the wireless power receiver 200 to which power can be transferred, then the operation phase of the wireless power transmitter 100 will be returned to the selection phase 610.

3) Identification and Configuration Phase

The wireless power transmitter 100 in the identification and configuration phase 630 may receive identification information and/or configuration information transmitted by the wireless power receiver 200, thereby controlling power transmission to be effectively carried out.

Figure 15A:
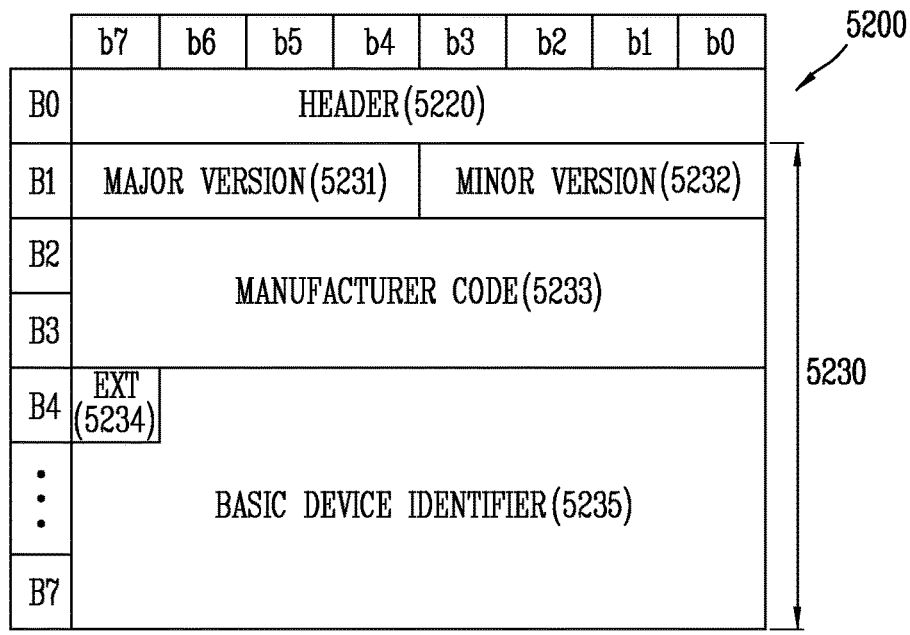
Figure 15B:
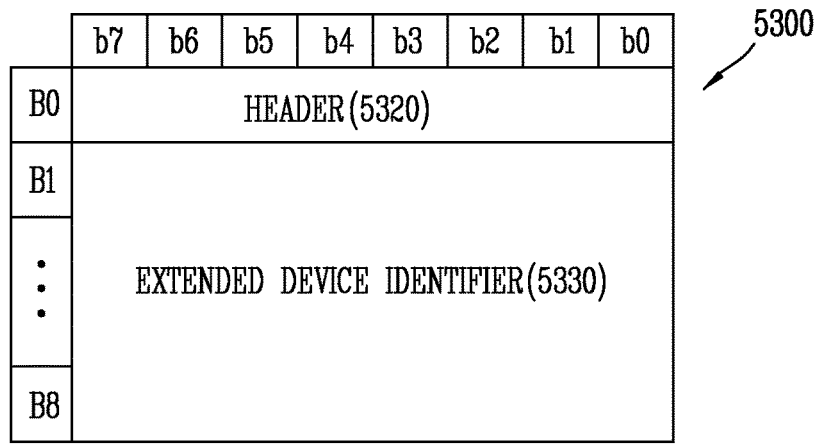

The wireless power receiver 200 in the identification and configuration phase 630 may transmit a power control message including its own identification information. For this purpose, the wireless power receiver 200, for instance, may transmit an identification packet 5200 including a message indicating the identification information of the wireless power receiver 200 as illustrated in FIG. 15A. The packet 5200 may include a header 5220 for notifying a packet indicating identification information and a message 5230 including the identification information of the electronic device. The message 5230 may include information (2531 and 5232) indicating a version of the contract for contactless power transfer, information 5233 for identifying a manufacturer of the wireless power receiver 200, information 5234 indicating the presence or absence of an extended device identifier, and a basic device identifier 5235. Furthermore, if it is displayed that an extended device identifier exists in the information 5234 indicating the presence or absence of an extended device identifier, then an extended identification packet 5300 including the extended device identifier as illustrated in FIG. 15B will be transmitted in a separate manner. The packet 5300 may include a header 5320 for notifying a packet indicating an extended device identifier and a message 5330 including the extended device identifier. When the extended device identifier is used as described above, information based on the manufacturer's identification information 5233, the basic device identifier 5235 and the extended device identifier 5330 will be used to identify the wireless power receiver 200.

Figure 16:
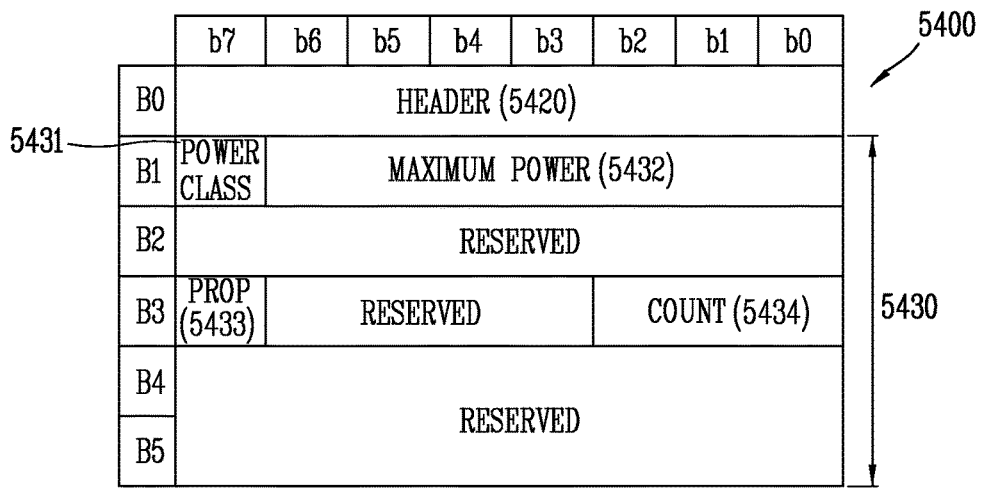
Figure 17:
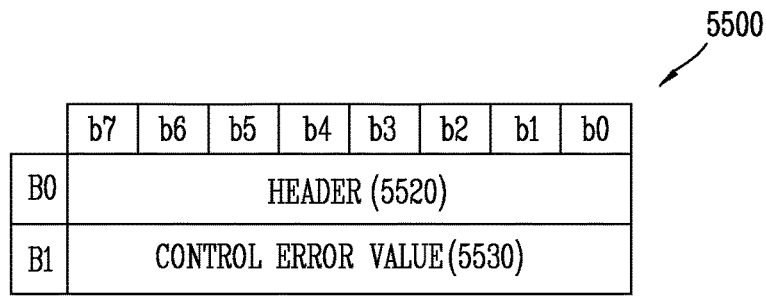

The wireless power receiver 200 may transmit a power control message including information on expected maximum power in the identification and configuration phase 630. To this end, the wireless power receiver 200, for instance, may transmit a configuration packet 5400 as illustrated in FIG. 16.

The packet may include a header 5420 for notifying that it is a configuration packet and a message 5430 including information on the expected maximum power. The message 5430 may include power class 5431, information 5432 on expected maximum power, an indicator 5433 indicating a method of determining a current of a main cell at the side of the wireless power transmitter, and the number 5434 of optional configuration packets. The indicator 5433 may indicate whether or not a current of the main cell at the side of the wireless power transmitter is determined as specified in the contract for wireless power transfer.

On the other hand, the wireless power transmitter 100 may generate a power transfer contract which is used for power charging with the wireless power receiver 200 based on the identification information and/or configuration information. The power transfer contract may include the limits of parameters determining a power transfer characteristic in the power transfer phase 640.

The wireless power transmitter 100 may terminate the identification and configuration phase 630 and return to the selection phase 610 prior to entering the power transfer phase 640. For instance, the wireless power transmitter 100 may terminate the identification and configuration phase 630 to find another electronic device that can receive power in a wireless manner.

4) Power Transfer Phase

The wireless power transmitter 100 in the power transfer phase 640 transmits power to the wireless power receiver 200.

Figure 18:
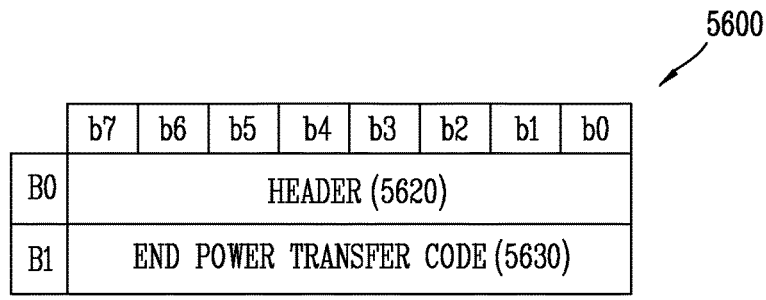

The wireless power transmitter 100 may receive a power control message from the wireless power receiver 200 while transferring power, and control a characteristic of the power applied to the transmitting coil in response to the received power control message. For example, the power control message used to control a characteristic of the power applied to the transmitting coil may be included in a control error packet 5500 as illustrated in FIG. 18. The packet 5500 may include a header 5520 for notifying that it is a control error packet and a message 5530 including a control error value. The wireless power transmitter 100 may control the power applied to the transmitting coil according to the control error value. In other words, a current applied to the transmitting coil may be controlled so as to be maintained if the control error value is "0," reduced if the control error value is a negative value, and increased if the control error value is a positive value.

The wireless power transmitter 100 may monitor parameters within a power transfer contract generated based on the identification information and/or configuration information in the power transfer phase 640. As a result of monitoring the parameters, if power transmission to the wireless power receiver 200 violates the limits included in the power transfer contract, then the wireless power transmitter 100 may cancel the power transmission and return to the selection phase 610.

The wireless power transmitter 100 may terminate the power transfer phase 640 based on a power control message transferred from the wireless power receiver 200.

For example, if the charging of a battery has been completed while charging the battery using power transferred by the wireless power receiver 200, then a power control message for requesting the suspension of wireless power transfer will be transferred to the wireless power transmitter 100. In this case, the wireless power transmitter 100 may receive a message for requesting the suspension of the power transmission, and then terminate wireless power transfer, and return to the selection phase 610.

For another example, the wireless power receiver 200 may transfer a power control message for requesting renegotiation or reconfiguration to update the previously generated power transfer contract. The wireless power receiver 200 may transfer a message for requesting the renegotiation of the power transfer contract when it is required a larger or smaller amount of power than the currently transmitted power amount. In this case, the wireless power transmitter 100 may receive a message for requesting the renegotiation of the power transfer contract, and then terminate contactless power transfer, and return to the identification and configuration phase 630.

To this end, a message transmitted by the wireless power receiver 200, for instance, may be an end power transfer packet 5600 as illustrated in FIG. 18. The packet 5600 may include a header 5620 for notifying that it is an end power transfer packet and a message 5630 including an end power transfer code indicating the cause of the suspension. The end power transfer code may indicate any one of charge complete, internal fault, over temperature, over voltage, over current, battery failure, reconfigure, no response, and unknown error.

Communication Method of Plural Electronic Devices

Hereinafter, description will be given of a method by which at least one electronic device performs communication with one wireless power transmitter using wireless power signals.

Figure 19:
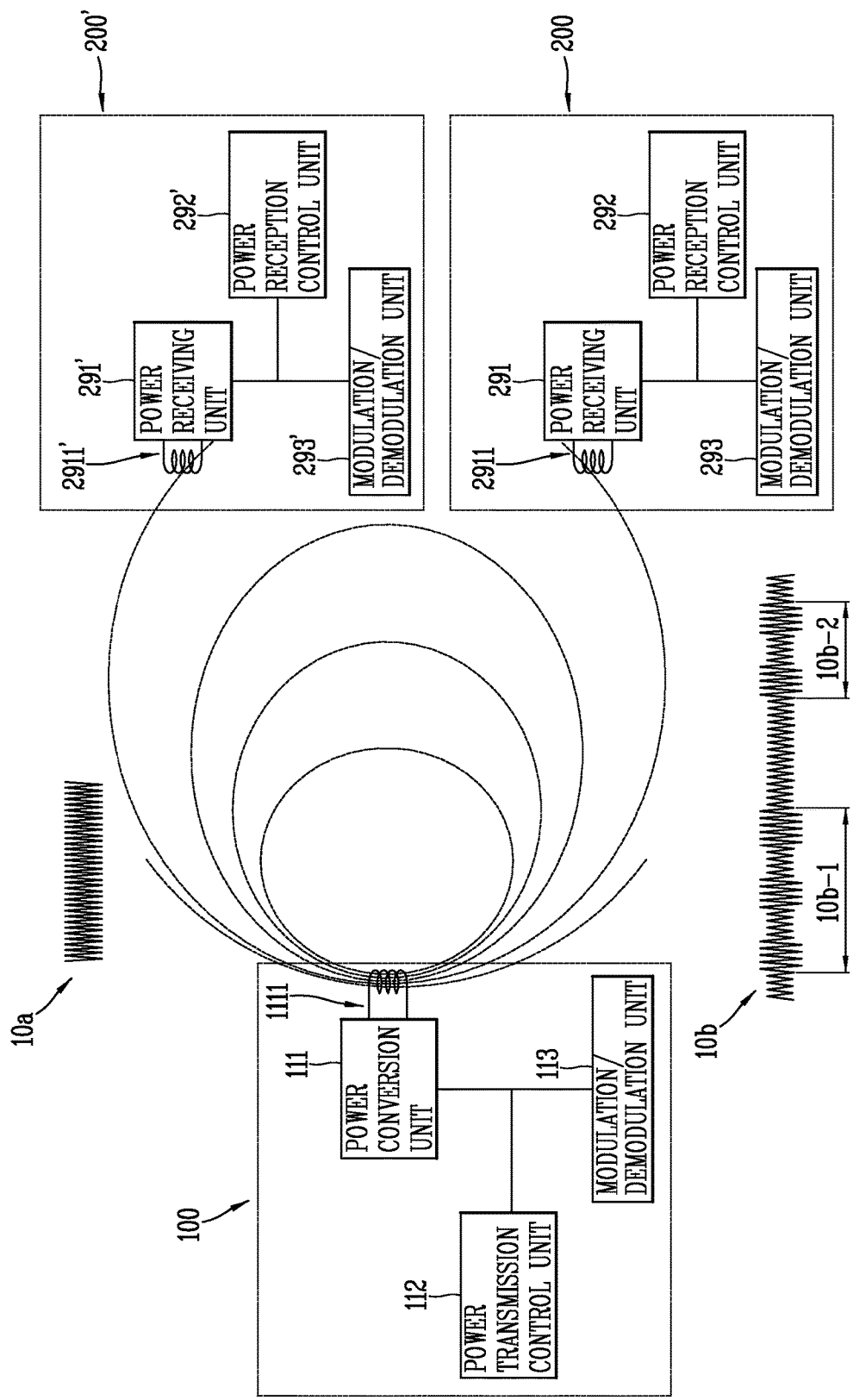
FIG. 19 is a conceptual diagram illustrating a method in which a wireless power transfer apparatus transfers power to one or more wireless power receiving apparatuses.

FIG. 19 is a conceptual view illustrating a method of transferring power to at least one wireless power receiver from a wireless power transmitter.

The wireless power transmitter 100 may transmit power to one or more wireless power receivers 200 and 200'. FIG. 19 illustrates two electronic devices 200 and 200', but the methods according to the exemplary embodiments disclosed herein may not be limited to the number of electronic devices shown.

An active area and a detection area may be different according to the wireless power transfer method of the wireless power transmitter 100.

Therefore, the wireless power transmitter 100 may determine whether there is a wireless power receiver located on the active area or the detection area according to the resonance coupling method or a wireless power receiver located on the active area or the detection area according to the induction coupling method. According to the determination result, the wireless power transmitter 100 which supports each wireless power transfer method may change the power transfer method for each wireless power receiver.

In the wireless power transfer according to the exemplary embodiments disclosed herein, when the wireless power transmitter 100 transfers power to the one or more electronic devices 200 and 200' according to the same wireless power transfer method, the electronic devices 200 and 200' may perform communications through the wireless power signals without inter-collision.

Referring to FIG. 19, a wireless power signal 10*a* generated by the wireless power transmitter 100 may arrive at the first electronic device 200' and the second electronic device 200, respectively. The first and second electronic devices 200' and 200 may transmit wireless power messages using the generated wireless power signal 10*a*.

The first electronic device 200' and the second electronic device 200 may operate as wireless power receivers for receiving a wireless power signal. The wireless power receiver in accordance with the exemplary embodiments disclosed herein may include a power receiving unit 291', 291 to receive the generated wireless power signal, a modulation/demodulation unit 293', 293 to modulate or demodulate the received wireless power signal, and a controller 292', 292 to control each component of the wireless power receiver.

In addition, the present disclosure provides a communication protocol selecting method in a wireless charging system (or a wireless power transmitter/receiver) employing multiple communication protocols, a structure of a transmitter interoperable with an induction method and a resonance method in a wireless charging system, and a communication method in a transmitter interoperable with an induction method and a resonance method.

The foregoing description has been given of the wireless power transmission and reception method based on the WPC's standard. In addition, the present disclosure proposes a method in which a wireless power transmitter wirelessly transfers power to each of wireless power receivers, which comply with (support) different standards, so as to be appropriate for each standard. Furthermore, the present disclosure provides a new type of multi-coil solution, capable of being interoperable with a WPC standard and a PMA standard and extending a degree of position freedom of receivers. Hereinafter, detailed description thereof will be given.

Hereinabove, a wireless power transferring and receiving method according to an embodiment of the present invention has been described based on WPC standard. Furthermore, the present invention proposes a method which controls an output voltage supplied to a battery to increase charging efficiency in transferring wireless power to a wireless power receiving apparatus according to the WPC standard. Hereinafter, a method for increasing charging efficiency will be described in more detail.

Figure 20:
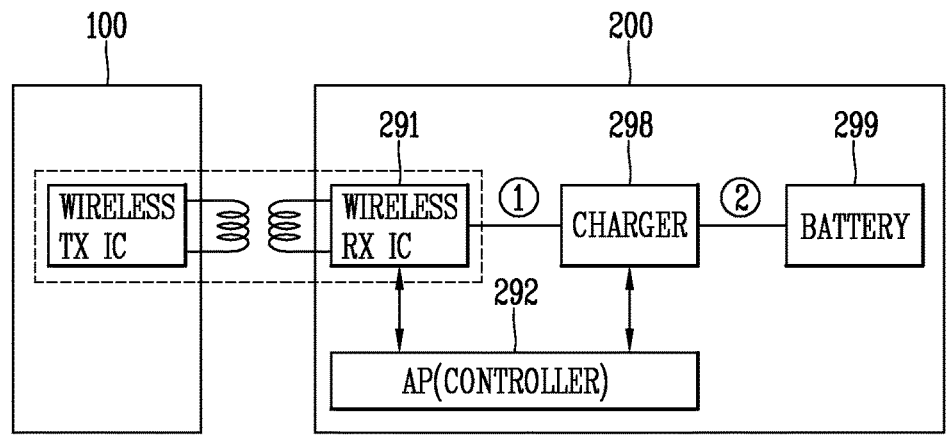
FIG. 20 is a block diagram illustrating a wireless charging system according to an embodiment of the present invention.
Figure 21:
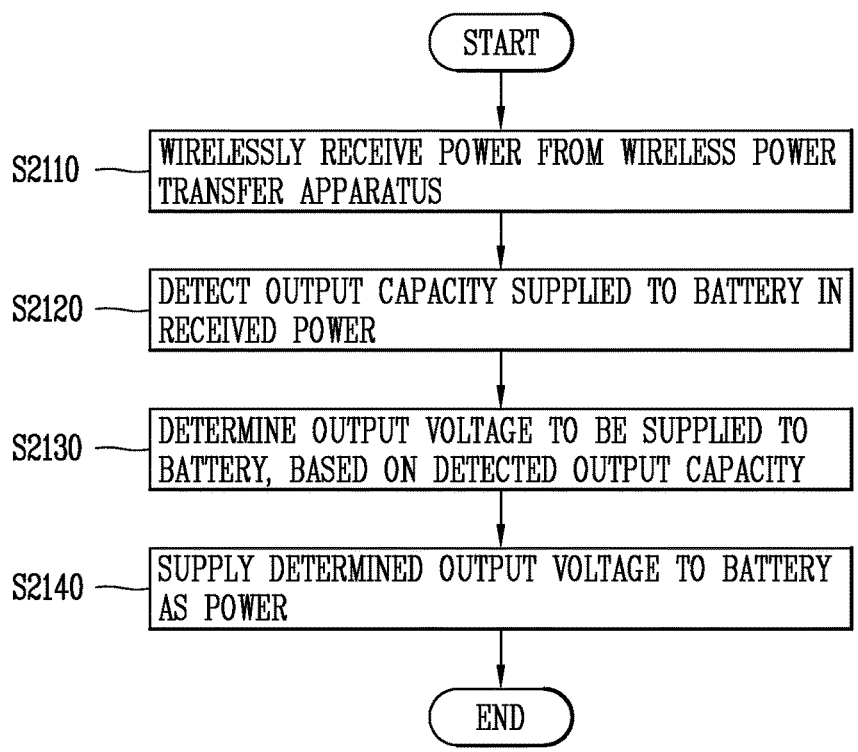
FIG. 21 is a flowchart illustrating a method in which a wireless charging receiver supplies power to a battery, in the wireless charging system of FIG. 20.

FIG. 20 is a block diagram illustrating a wireless charging system according to an embodiment of the present invention. FIG. 21 is a flowchart illustrating a method in which a wireless charging receiver supplies power to a battery, in the wireless charging system of FIG. 20.

A wireless power transfer apparatus 100 may wirelessly transfer power to a wireless power receiving apparatus 200, based on at least one communication standard. For example, the wireless power transfer apparatus 100 and the wireless power receiving apparatus 200 may wirelessly transfer and receive power, based on the WPC standard.

Moreover, the wireless power receiving apparatus 200 may receive wireless power in at least one of an inductive coupling scheme and a resonant scheme. That is, the present invention may be applied to all methods of wirelessly transferring power.

The wireless power receiving apparatus 200 may include a power receiving unit 291, for receiving power from the wireless power transfer apparatus 100. The power receiving unit 291 may include at least one of a coil, a rectifier circuit a smoothing circuit, and a prevention circuit which are based on standard. Here, the standard may be based on at least one of the WPC standard and PMA standard.

The coil may receive wireless power by using an induction current. For example, the coil may be a coil that receives wireless power in the form of a magnetic field or an electromagnetic field according to an inductive coupling scheme. Also, the coil may receive wireless power in the form of a magnetic field or an electromagnetic field according to a resonant scheme.

Moreover, the rectifier circuit and the smoothing circuit may convert a wireless power signal, received by the coil, into a direct current (DC) signal, and the prevention circuit may prevent an overvoltage or an overcurrent from occurring.

The wireless power receiving apparatus 200 may further include a charging unit 298 in order for a battery 299 to be charged with power received by the power receiving unit 291. The charging unit 298 may convert an alternating current (AC) current, received by the coil, into a DC current in order for power to be supplied to the battery 299. Also, even when a DC current is received by the coil, the charging unit 298 may convert a current so as to supply power suitable for the battery 299.

Moreover, the wireless power receiving apparatus 200 may further include the battery 299 which is charged with power received from the wireless power transfer apparatus 100. The battery 299 may be included in the wireless power receiving apparatus 200, and may supply power necessary for an operation of the wireless power receiving apparatus 200.

Moreover, the wireless power receiving apparatus 200 may further include a power reception control unit 292 that controls a plurality of elements configuring the wireless power receiving apparatus 200. In more detail, the power reception control unit 292 may control the power receiving unit 291 and the charging unit 298 to control an output voltage of power supplied to the battery 299. Furthermore, as described above with reference to FIG. 2B, the power reception control unit 292 may control the elements of the wireless power receiving apparatus 200.

The wireless power receiving apparatus 200 according to an embodiment of the present invention may include some of the above-described elements, and moreover may include an additional element in addition to the above-described elements depending on the case.

Hereinafter, a method that increases charging efficiency and charges the battery in the wireless power receiving apparatus 200 will be described in more detail. First, in operation S2110, the wireless power receiving apparatus 200 according to an embodiment of the present invention may perform an operation of wirelessly receiving power from the wireless power transfer apparatus 100.

The wireless power receiving apparatus 200 may receive wireless power in at least one or more schemes. For example, the wireless power receiving apparatus 200 may receive wireless power, based on the WPC standard.

At this time, the wireless power may be received through the power receiving unit 291 included in the wireless power receiving apparatus 200. In more detail, the wireless power may be transferred as a magnetic field or an electromagnetic field from a primary coil, included in the wireless power transfer apparatus 100, to a secondary coil included in the power receiving unit 291. Here, each of the primary coil and the secondary coil may be a coil based on the same standard.

When the wireless power is received, the wireless power receiving apparatus 200 according to an embodiment of the present invention may perform an operation of detecting an output capacity supplied to the battery 299 based on the received power in operation S2120.

When the wireless power is received from the wireless power transfer apparatus 100, the power receiving unit 291 may transfer the received power to the charging unit 298 in order for the battery 299 to be charged with the power.

At this time, the power reception control unit 292 may detect an output capacity which is output from at least one of the power receiving unit 291 and the charging unit 298. That is, the power reception control unit 292 may acquire power information supplied to the battery 299. Here, the output capacity may denote power that is received by the power receiving unit 291 and is transferred to the charging unit 298.

In order to detect the output capacity, the power reception control unit 292 may detect a current output from at least one of the power receiving unit 291 and the charging unit 298.

For example, referring to FIG. 20, the power reception control unit 292 may sense (①) a current output from the power receiving unit 291 to detect an output capacity supplied to the battery 299. To this end, the wireless power receiving apparatus 200 may further include a sensing unit that senses a current.

In more detail, the power reception control unit 292 may sense (①) a current input to the charging unit 298. Here, the current may be sensed through Iusb sensing.

As another example, referring to FIG. 20, the power reception control unit 292 may detect a current (②) output from the charging unit 298 to detect an output capacity output from the power receiving unit 291. In this case, the power reception control unit 292 may calculate the output capacity output from the power receiving unit 291 by using the current (②) output from the charging unit 298 and a charging efficiency of the wireless power receiving apparatus 200. Here, the current output from the charging unit 298 may be sensed by sensing Isub.

The power reception control unit 292 may calculate the output capacity of the power receiving unit 291 by using the detected current. In more detail, the power reception control unit 292 may calculate an output capacity by using a voltage, which is currently set in the wireless power receiving apparatus 200, and the current.

In this case, the voltage which is set in the wireless power receiving apparatus 200 is a predetermined voltage, and may be a basic voltage of the wireless power receiving apparatus 200, a voltage based on the WPC standard, or a voltage based on an output capacity supplied to the battery 299.

That is, the basic voltage which is to be supplied to the battery 299 before the power is received may be set in the wireless power receiving apparatus 200. For example, the basic voltage may be set to 5 V, based on output power equal to or lower than 3 W.

In this case, when wireless power starts to be received, the power reception control unit 292 may calculate an output capacity, based on the basic voltage. Subsequently, when the voltage is varied by the power reception control unit 292, the power reception control unit 292 may calculate the output capacity, based on the varied voltage.

When the output capacity is detected, the wireless power receiving apparatus 200 according to an embodiment of the present invention may perform an operation of determining an output voltage to be supplied to the battery 299, based on the detected output capacity in operation S2130.

The wireless power receiving apparatus 200 according to an embodiment of the present invention may supply, as power, one of a plurality of output voltages to the battery 299. That is, the wireless power receiving apparatus 200 may have one of the plurality of output voltages. Also, the wireless power receiving apparatus 200 may change the one output voltage to another output voltage of the plurality of output voltages while the power is being supplied to the battery 299, and supply the changed output voltage as power.

Therefore, the power reception control unit 292 may determine an output voltage, which is to be supplied to the battery 299, from among the plurality of output voltages. That is, the output voltage may be changed by the power reception control unit 292. For example, the power reception control unit 292 may change the output voltage so as to be suitable for power received from the power receiving unit 291.

The output voltage to be supplied to the battery 299 may be changed based on an output capacity. That is, the power reception control unit 292 may determine an output voltage which is to be supplied to the battery 299, based on the detected output capacity.

This is for increasing a charging efficiency of power supplied to the battery 299. That is, the charging efficiency may be changed based on an output capacity and an output voltage. In more detail, the charging efficiency may be the maximum when an output voltage is a specific output voltage in a specific output capacity. For example, when an output voltage is 7 V in a 7 W class output capacity, the charging efficiency may be the maximum. Here, the charging efficiency may denote power which is actually charged in the battery 299 with respect to power supplied to the battery 299.

In this case, the wireless power receiving apparatus 200 according to an embodiment of the present invention may store information about an output voltage, which enables the charging efficiency to be the maximum in different output capacities, in a memory (not shown). The memory may store corresponding information, in which different output voltages are respectively mapped to different output capacities, as shown in the following Table 1.

TABLE 1

| RX IC OUTPUT VOLTAGE | RX IC OUTPUT CAPCAITY | BATTERY CONVERSION CHARGING CURRENT |
| --- | --- | --- |
| 5 V | 3 W UNDER | 580 mA UNDER |
| 6 V | 3 W-4.6 W | 580 mA-900 mA |
| 7 V | 4.6 W-6 W | 0.9 A-1.2 A |
| 8 V | 6 W OVER | 1.2 A OVER |

In Table 1, the RX IC may denote the power receiving unit 291. Also, as seen in Table 1, a current charged in the battery 299 may be changed while the battery 299 is being charged.

The power reception control unit 292 may determine the output voltage based on the output capacity with reference to the memory. For example, when the output capacity is 4.5 W, the power reception control unit 292 may determine the output voltage as 6 V.

A value of the output voltage based on the output capacity stored in the memory may be obtained experimentally or arithmetically.

The present invention may set output voltages corresponding to various output capacities according to a selection of a user when the wireless power receiving apparatus 200 is initially set, in addition to the values stored in Table 1.

Therefore, the present invention can increase a charging efficiency of the wireless power receiving apparatus 200, and moreover can provide the wireless power receiving apparatus 200 which performs charging with low power, medium power, and high power. In more detail, the present invention varies an output voltage and an output current, thereby supplying various output capacities to the battery 299. Here, the low power may denote power of 5 W or less, the medium power may denote power higher than 5 W and equal to or lower than 15 W, and the high power may denote power higher than 15 W.

The present invention will be described based on low power, but is not limited thereto. The present invention may be used in the same scheme according to an output voltage in medium power and high power.

Hereinabove, a method in which the wireless power receiving apparatus 200 wirelessly receiving power determines an output voltage for charging the battery 299 has been described. The wireless power receiving apparatus 200 may supply an output voltage, which enables charging efficiency to be the maximum in each output capacity, to the battery 299 as power.

Hereinafter, a method in which the wireless power receiving apparatus 200 determines an output voltage to be supplied to the battery 299 based on an output capacity will be described in more detail with reference to the drawings.

Figure 22:
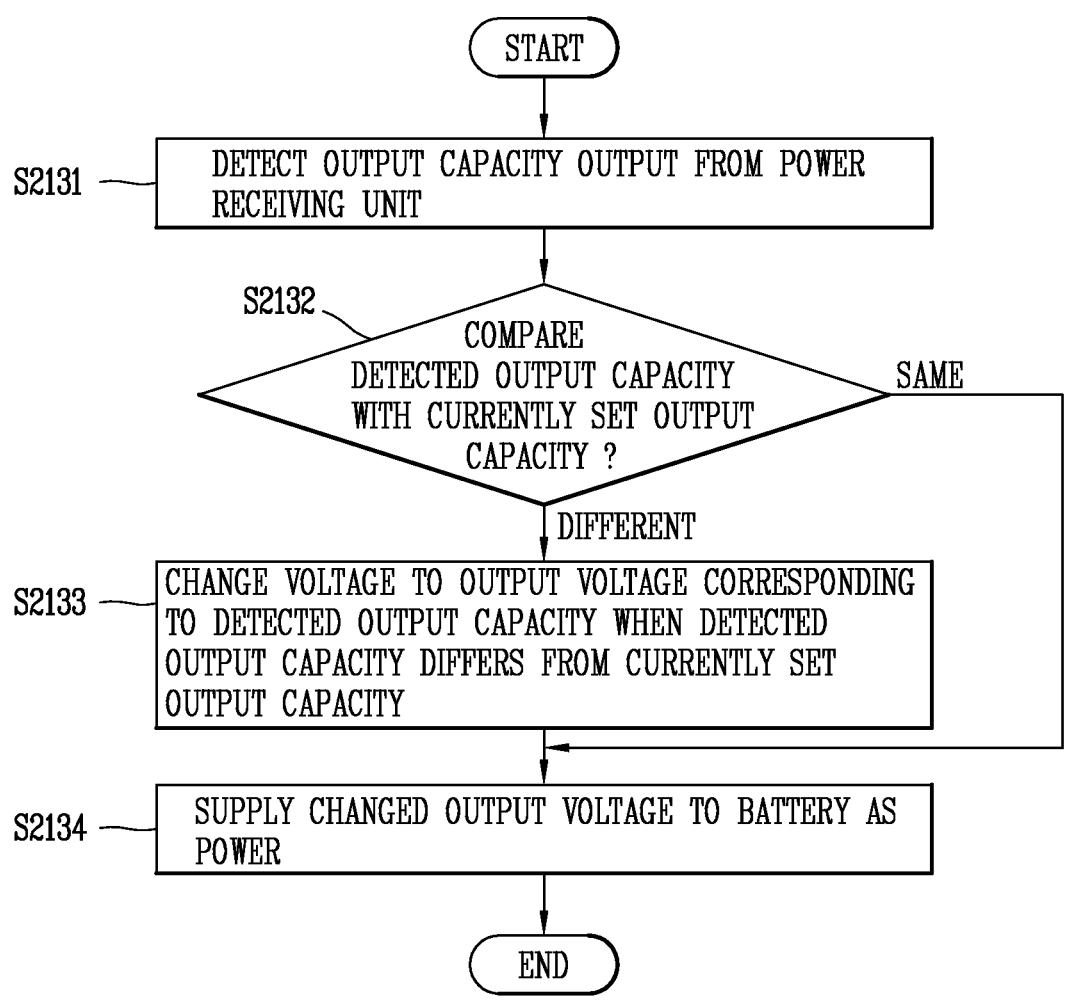
FIG. 22 is a flowchart illustrating a method of determining an output voltage to be supplied to a battery, based on an output capacity.
Figure 23:
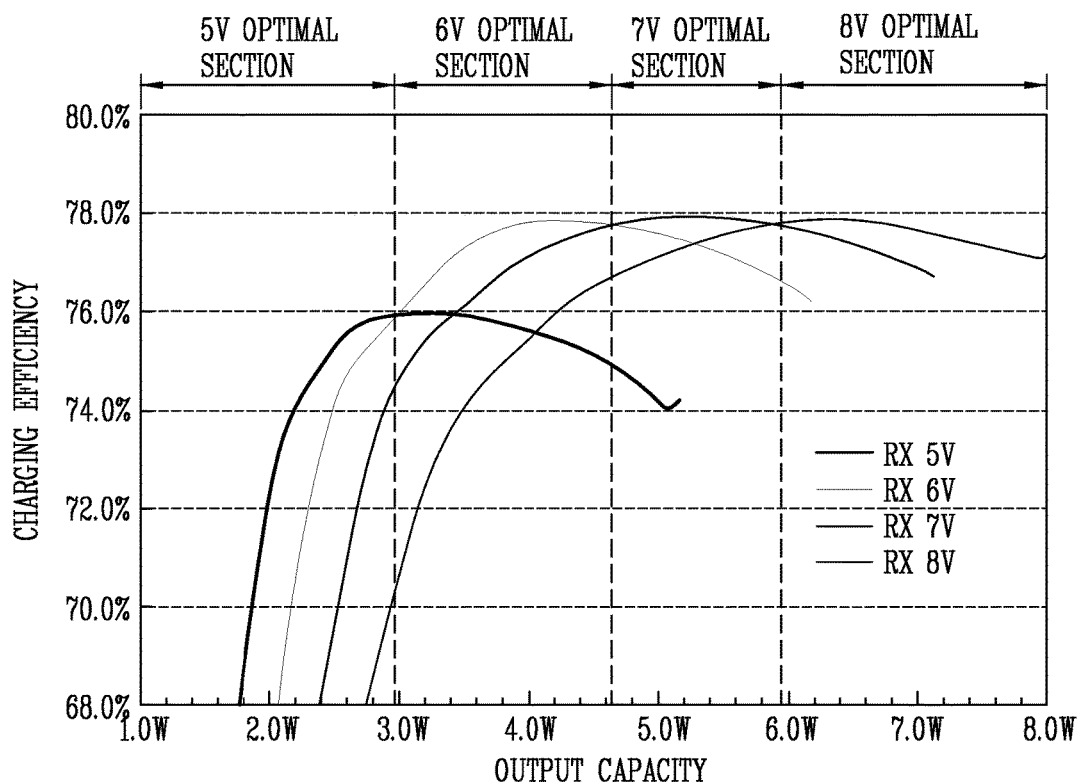
FIG. 23 is a graph showing charging efficiency with respect to output power in each output capacity.
Figure 24:
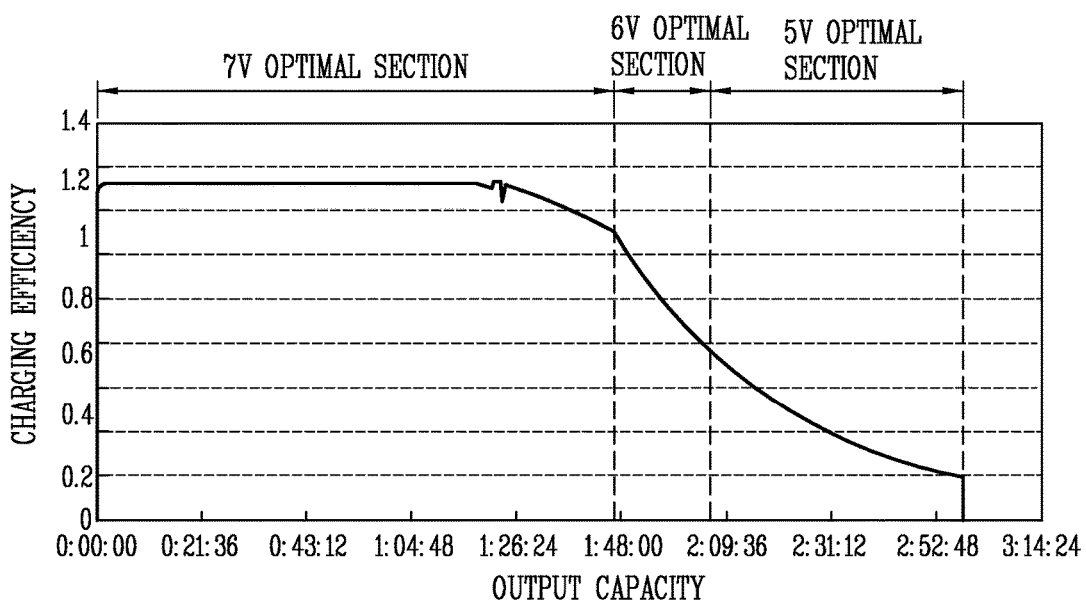
FIG. 24 is a graph showing a charging current with respect to an output voltage which varies while a battery is being continuously charged.

FIG. 22 is a flowchart illustrating a method of determining an output voltage to be supplied to a battery, based on an output capacity. FIG. 23 is a graph showing charging efficiency with respect to output power in each output capacity. FIG. 24 is a graph showing a charging current with respect to an output voltage which varies while a battery is being continuously charged.

First, in operation S2131, the wireless power receiving apparatus 200 may wirelessly receive power, and detect an output capacity output from the power receiving unit 291 or the charging unit 298 while the battery 299 is being charged.

The wireless power receiving apparatus 200 according to an embodiment of the present invention may wirelessly receive the power, and detect an output capacity of the wireless power receiving apparatus 200 so as to increase a charging efficiency of the battery 299 while the battery 299 is being charged.

The output capacity may measure a current output from the power receiving unit 291 or the charging unit 298 to detect the output capacity.

In more detail, the power reception control unit 292 may measure an output current which is output from the power receiving unit 291 or the charging unit 298, and multiply the output current and a currently set output voltage to detect an output capacity.

In this case, the power reception control unit 292 may detect the output capacity at a predetermined time interval or in real time. That is, the power reception control unit 292 may sense a change in the output capacity at a predetermined interval or in real time while the battery 299 is being charged.

Subsequently, in operation S2132, the wireless power receiving apparatus 200 according to an embodiment of the present invention may compare the output capacity with a currently set output capacity value.

In the wireless power receiving apparatus 200 according to an embodiment of the present invention, an initial output capacity and an initial output voltage may be previously set before wireless power is received, namely, in an initial state. In this case, the wireless power receiving apparatus 200 may supply power to the battery 299 as an initial output capacity at an initial stage where the wireless power is received, and then supply power to the battery 299 as an output capacity which is set by the power reception control unit 292.

The power reception control unit 292 may compare a currently set initial output capacity and the detected output capacity. In this case, when the currently set output capacity and the detected output capacity are within the same range, the power reception control unit 292 may supply power to the battery 299 as the currently set output capacity. Here, a range of an output capacity is a predetermined range, and may be a range of an output capacity having the same output voltage.

However, when the output capacity and the detected output capacity are within different ranges, the power reception control unit 292 may change a currently set output voltage, based on the detected output capacity. That is, the power reception control unit 292 may change the currently set output voltage to an output voltage, which enables a charging efficiency of the battery 299 to be the maximum, in the detected output capacity.

In this case, the memory of the wireless power receiving apparatus 200 may store an output voltage which enables a charging efficiency of the battery 299 to be the maximum depending on an output capacity. The power reception control unit 292 may change an output voltage, which is to be supplied to the battery 299, by using the stored output voltage. For example, referring to the graph of FIG. 23, it can be seen that charging efficiency is changed depending on an output capacity. In this case, it can be seen that the charging efficiency is changed depending on an output voltage.

In this case, the present invention may change an output voltage to another output voltage, which enables charging efficiency to be the maximum depending on an output capacity, by using that charging efficiency is changed depending on an output voltage in each output capacity.

Moreover, when a change in the output capacity is sensed while the battery 299 is being charged, the power reception control unit 292 may change the output voltage. In more detail, when an output capacity is detected at a predetermined time interval or in real time, the power reception control unit 292 may compare the detected output capacity with a currently set output capacity. When the detected output capacity and the currently set output capacity are within different ranges, the power reception control unit 292 may change an output voltage. That is, the output voltage may be changed in real time while the battery 299 is being charged.

When the output voltage is changed, the wireless power receiving apparatus 200 according to an embodiment of the present invention may supply the changed output voltage to the battery 299 as power in operation S2134.

The power reception control unit 292 may supply the changed output voltage to the battery 299 as power. Therefore, the wireless power receiving apparatus 200 can more increase charging efficiency than the related art where an output voltage is fixed.

For example, referring to the graph of FIG. 24, the wireless power receiving apparatus 200 changes an output voltage, which is to be supplied to the battery 299, according to a charging time and performs charging. In this case, a current charged in the battery 299 can be gradually reduced according to the charging time. Here, the current charged in the battery 299 may be calculated by using a current output from the charging unit 298. Thus, an output voltage being determined based on the current output from the charging unit 298 will be described below.

In more detail, referring to FIG. 24, when a current output from the charging unit 298 is 1.2 A, the power reception control unit 292 may control the power receiving unit 291 and the charging unit 298 in order for the battery 299 to be charged with a voltage of 7 V. Subsequently, when the current output from the charging unit 298 is equal to or lower than 1 A, the power reception control unit 292 may control the power receiving unit 291 and the charging unit 298 to change an output voltage, which is set to 7 V, to 6 V and perform charging.

Furthermore, when the current output from the charging unit 298 is equal to or lower than 580 mA, the power reception control unit 292 may control the power receiving unit 291 and the charging unit 298 to change the output voltage to 5 V and perform charging.

That is, the power reception control unit 292 may detect an output capacity while charging is being performed, and control an output voltage in order for the battery 299 to be charged with an output voltage which enables charging efficiency to be the maximum in a current output capacity.

When the current output from the charging unit 298 reaches a predetermined value, the power reception control unit 292 may stop charging. For example, when the current output from the charging unit 298 is equal to or lower than 200 mA, the power reception control unit 292 may determine that charging of the battery 299 is completed, and control the power reception control unit 291 and the charging unit 298 to stop the charging.

As described above, the present invention changes an output voltage while a battery is being charged, thereby increasing a charging efficiency of the battery. Accordingly, the present invention can provide a wireless power receiving apparatus that has higher charging efficiency than a related art wireless power receiving apparatus in which an output voltage is fixed.

In a wireless power receiving apparatus that receives wireless power, the present invention varies an output voltage while a battery is being charged, thereby maximizing an efficiency of the output voltage supplied to the battery.

Moreover, the present invention provides a wireless power receiving apparatus which has high charging efficiency, thereby shortening a charging time.

Moreover, the present invention can reduce heating of a wireless power receiving apparatus while charging is being performed, thereby increasing power supplied to a battery.

Moreover, the present invention provides a method of controlling a varied output voltage in a wireless power receiving apparatus that receives wireless power, thereby providing a wireless power receiving apparatus that receives wireless power in various environments.

Except for a case of being applied to only a wireless charger, it is obvious to those skilled in the art that the elements of the wireless power transfer apparatus according to the embodiments of the present invention are applied to docking stations, terminal cradle devices, various electronic devices, etc.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. An apparatus, comprising:
a power receiving unit configured to receive power wirelessly;
a charging unit configured to receive the power via the power receiving unit; and
a controller configured to:
detect output capacity of the power receiving unit at a predetermined interval such that a charging efficiency is maintained at maximum while power is supplied to a battery;
change an output voltage of the power supplied to the battery in real time based on the detected output capacity; and
cause charging of the battery via the charging unit at the changed output voltage.

2. The apparatus of claim 1, wherein the controller is further configured to:
monitor a current output from the charging unit at a predetermined interval or in real time to detect the output capacity of the power receiving unit; and
change the output voltage of the power supplied to the battery in real time when a change in the output capacity is detected.

3. The apparatus of claim 2, wherein:
the changed output voltage is a first value when the output capacity is within a first range;
the changed output voltage is a second value when the output capacity is within a second range; and
the controller is further configured to control the power receiving unit to:
supply the power to the battery at the changed output voltage of the first value when the output capacity is within the first range; and
supply the power to the battery at the changed output voltage of the second value when the output capacity is within the second range.

4. The apparatus of claim 3, wherein the controller is further configured to change the output voltage from a first output voltage to a second output voltage when the output capacity is changed to be in the second range while the power is supplied to the battery at the first output voltage.

5. The apparatus of claim 4, wherein the controller is further configured to cause the charging unit to stop supplying the power to the battery when the output capacity is equal to or less than predetermined output capacity.

6. The apparatus of claim 1, wherein the controller is further configured to:
maintain the output voltage of the power supplied to the battery while the battery is charged via the charging unit based on the detected output capacity when no change is detected in the output capacity.

7. The apparatus of claim 6, wherein the controller is further configured to:
determine the output capacity by using a currently set voltage and a current output from the power receiving unit; and
control the power receiving unit to change the currently set voltage to a second voltage based on the determined output capacity and to supply power to the battery at the second voltage.

8. The apparatus of claim 1, wherein the controller is further configured to:
detect a current supplied from the charging unit to the battery;
determine the output capacity by using the detected current, a currently set voltage, and a charging efficiency of the charging unit; and
control the power receiving unit to change the currently set voltage to another voltage based on the determined output capacity.

9. The apparatus of claim 8, wherein the controller is further configured to cause the charging unit to stop supplying the power to the battery when the current supplied to the battery is equal to or less than a predetermined value.

10. A power supply method performed by a wireless power receiving apparatus, the method comprising: detecting output capacity at a predetermined interval, by a controller, such that a charging efficiency is maintained at maximum while power is supplied to a battery; changing an output voltage of the power supplied to the battery in real time, by the controller, based on the detected output capacity; and causing charging of the battery at the changed output voltage by the controller.

11. The method of claim 10, wherein the detecting of the output capacity comprises: monitoring a current output from a charging unit at a predetermined interval or in real time, by the controller, to detect the output capacity; and changing the output voltage of the power supplied to the battery in real time, by the controller, when a change in the output capacity is detected.

12. The method of claim 11, wherein:
different output voltages are mapped to different output capacities; and
the changing of the output voltage comprises changing a currently set output voltage to another output voltage when the currently set output voltage is different from an output voltage mapped to a currently detected output capacity, the changed output voltage corresponding to the currently detected output capacity.

13. The method of claim 12, wherein the changing of the output voltage further comprises maintaining the currently set output voltage when the currently set output voltage matches the output voltage mapped to the currently detected output capacity.

14. The method of claim 12, wherein the changing of the output voltage further comprises:
setting the output voltage as a first value when the detected output capacity is within a first range; and
setting the output voltage as a second value when the detected output capacity is within a second range.

15. The method of claim 10, further comprising stopping the charging of the battery when the output voltage is equal to or less than a predetermined value.

16. A wireless charging system comprising:
a transfer apparatus configured to transfer power wirelessly; and
a receiving apparatus configured to receive the power wirelessly from the transfer apparatus,
wherein the receiving apparatus comprises:
a power receiving unit configured to receive the power wirelessly;
a charging unit configured to receive the power via the power receiving unit; and
a controller configured to:
detect output capacity of the power receiving unit at a predetermined interval such that a charging efficiency is maintained at maximum while power is supplied to a battery;
change an output voltage of the power supplied to the battery in real time based on the detected output capacity; and
cause charging of the battery via the charging unit at the changed output voltage.

17. The wireless charging system of claim 16, wherein the controller is further configured to:
monitor a current output from the charging unit at a predetermined interval or in real time to detect the output capacity of the power receiving unit; and
change the output voltage of the power supplied to the battery in real time when a change in the output capacity is detected.

18. The wireless charging system of claim 17, wherein:
the changed output voltage is a first value when the output capacity is within a first range;
the changed output voltage is a second value when the output capacity is within a second range; and
the controller is further configured to control the power receiving unit to:
supply the power to the battery at the changed output voltage of the first value when the output capacity is within the first range; and
supply the power to the battery at the changed output voltage of the second value when the output capacity is within the second range.

19. The wireless charging system of claim 18, wherein the controller is further configured to change the output voltage from a first output voltage to a second output voltage when the output capacity is changed to be in the second range while the power is supplied to the battery at the first output voltage.

20. The wireless charging system of claim 19, wherein the controller is further configured to cause the charging unit to stop supplying the power to the battery when the output capacity is equal to or less than predetermined output capacity.

* * * * *